US012625596B1

(12) United States Patent
Beebe et al.

(10) Patent No.: US 12,625,596 B1
(45) **Date of Patent: *May 12, 2026**

(54) VOICE COMMUNICATION TARGETING USER INTERFACE

(71) Applicant: Amazon Technologies, Inc., Seattle, WA (US)

(72) Inventors: Blair Harold Beebe, Menlo Park, CA (US); Katherine Ann Baker, Kirkland, WA (US); David Michael Rowell, Snoqualmie, WA (US); Peter Chin, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 412 days.

This patent is subject to a terminal disclaimer.

(21) Appl. No.: 18/378,913

(22) Filed: Oct. 11, 2023

Related U.S. Application Data

(63) Continuation of application No. 17/549,415, filed on Dec. 13, 2021, now Pat. No. 11,809,686, which is a
(Continued)

(51) Int. Cl.
| | |
|---|---|
| *G06F 3/0482* | (2013.01) |
| *G06F 3/16* | (2006.01) |
(Continued)

(52) U.S. Cl.
CPC ............ *G06F 3/0482* (2013.01); *G06F 3/167* (2013.01); *G10L 15/083* (2013.01); *G10L 15/22* (2013.01);
(Continued)

(58) Field of Classification Search
CPC ..... G06F 3/0482; G06F 3/167; G10L 15/083; G10L 15/22
(Continued)

(56) References Cited

U.S. PATENT DOCUMENTS

| | | | |
|---|---|---|---|
| 8,789,094 B1 | 7/2014 | Singh et al. | |
| 8,832,284 B1 * | 9/2014 | Owens | ............... H04N 21/4788 |
| | | | 709/228 |

(Continued)

OTHER PUBLICATIONS

Office Action for U.S. Appl. No. 17/549,415, mailed on Feb. 23, 2023, Inventor #1 Blair Harold Beebe, "Voice Communication Targeting User Interface", 14 pages.
(Continued)

*Primary Examiner* — William D Titcomb
(74) *Attorney, Agent, or Firm* — Nicholson De Vos Webster & Elliott LLP

(57) ABSTRACT

User interfaces may enable users to initiate voice-communications with voice-controlled devices via a Wi-Fi network or other network via an Internet Protocol (IP) address. The user interfaces may include controls to enable users to initiate voice communications, such as Voice over Internet Protocol (VOIP) calls, with devices that do not have connectivity with traditional mobile telephone networks, such as traditional circuit transmissions of a Public Switched Telephone Network (PSTN). For example, the user interface may enable initiating a voice communication with a voice-controlled device that includes network connectivity via a home Wi-Fi network. The user interfaces may indicate availability of devices and/or contacts for voice communications and/or recent activity of devices or contact.

20 Claims, 12 Drawing Sheets

Related U.S. Application Data continuation of application No. 16/797,592, filed on Feb. 21, 2020, now Pat. No. 11,204,685, which is a continuation of application No. 15/632,279, filed on Jun. 23, 2017, now Pat. No. 10,572,107.

(51) Int. Cl.

| | |
|---|---|
| *G10L 15/08* | (2006.01) |
| *G10L 15/22* | (2006.01) |
| *H04L 67/306* | (2022.01) |
| *H04W 84/12* | (2009.01) |

(52) U.S. Cl.
CPC .. *G10L 2015/223* (2013.01); *G10L 2015/228* (2013.01); *H04L 67/306* (2013.01); *H04W 84/12* (2013.01)

(58) Field of Classification Search
USPC .......................................................... 704/246
See application file for complete search history.

(56) References Cited

U.S. PATENT DOCUMENTS

| | | | |
|---|---|---|---|
| 8,874,665 | B2 | 10/2014 | Peterson et al. |
| 9,318,108 | B2* | 4/2016 | Gruber ................... B60K 35/00 |
| 9,720,955 | B1 | 8/2017 | Cao et al. |
| 9,836,940 | B2 | 12/2017 | Herbst et al. |
| 9,860,592 | B2 | 1/2018 | Yu |
| 9,959,037 | B2 | 5/2018 | Chaudhri et al. |
| 9,992,642 | B1 | 6/2018 | Rapp et al. |
| 9,993,642 | B2* | 6/2018 | Gerasimenko ..... A61N 1/36034 |
| 11,809,686 | B1* | 11/2023 | Beebe ...................... G10L 15/22 |
| 2006/0031291 | A1 | 2/2006 | Beckemeyer |
| 2007/0186002 | A1 | 8/2007 | Campbell et al. |
| 2009/0259718 | A1 | 10/2009 | O'Sullivan et al. |
| 2011/0082881 | A1 | 4/2011 | Chunilal |
| 2011/0212717 | A1 | 9/2011 | Rhoads et al. |
| 2012/0016678 | A1 | 1/2012 | Gruber et al. |
| 2012/0192090 | A1 | 7/2012 | Patterson et al. |
| 2012/0278076 | A1* | 11/2012 | Lloyd ..................... G10L 15/22 |
| | | | 704/E15.001 |
| 2013/0080898 | A1 | 3/2013 | Lavian et al. |
| 2013/0144951 | A1 | 6/2013 | Viswanath et al. |
| 2013/0157631 | A1 | 6/2013 | Wang et al. |
| 2013/0169549 | A1 | 7/2013 | Seymour et al. |
| 2014/0080428 | A1 | 3/2014 | Rhoads et al. |
| 2014/0184408 | A1 | 7/2014 | Herbst et al. |
| 2014/0258887 | A1 | 9/2014 | Larson et al. |
| 2014/0298177 | A1 | 10/2014 | Sun |
| 2015/0135086 | A1 | 5/2015 | Lee et al. |
| 2015/0370319 | A1 | 12/2015 | Alleaume et al. |
| 2015/0381674 | A1 | 12/2015 | Klemm et al. |
| 2016/0004393 | A1 | 1/2016 | Faaborg et al. |
| 2016/0282948 | A1 | 9/2016 | Wu |
| 2016/0378278 | A1 | 12/2016 | Sirpal |
| 2017/0046023 | A1 | 2/2017 | Kumar et al. |
| 2017/0085445 | A1 | 3/2017 | Layman et al. |
| 2017/0126689 | A1 | 5/2017 | Lloyd et al. |
| 2017/0235582 | A1 | 8/2017 | Ramirez |
| 2017/0262164 | A1 | 9/2017 | Jain et al. |
| 2017/0287300 | A1 | 10/2017 | Herbst et al. |
| 2017/0300162 | A1 | 10/2017 | Jang |
| 2017/0300192 | A1 | 10/2017 | Naour et al. |
| 2017/0308587 | A1 | 10/2017 | Nagel et al. |
| 2018/0121214 | A1 | 5/2018 | Faulkner et al. |
| 2018/0210872 | A1 | 7/2018 | Podmajersky et al. |
| 2019/0147721 | A1 | 5/2019 | Avitan et al. |

OTHER PUBLICATIONS

Non Final Office Action dtd Mar. 19, 2019 for U.S. Appl. No. 15/632,279 "Voice Communication Targeting User Interface" Beebe, 17 pages.

Office Action for U.S. Appl. No. 16/797,592, mailed on Apr. 5, 2021, "Voice Communication Targeting User Interface", 16 Pages.

Office Action for U.S. Appl. No. 15/632,279, mailed on Jun. 27, 2019, Beebe, "Voice Communication Targeting User Interface", 19 pages.

* cited by examiner

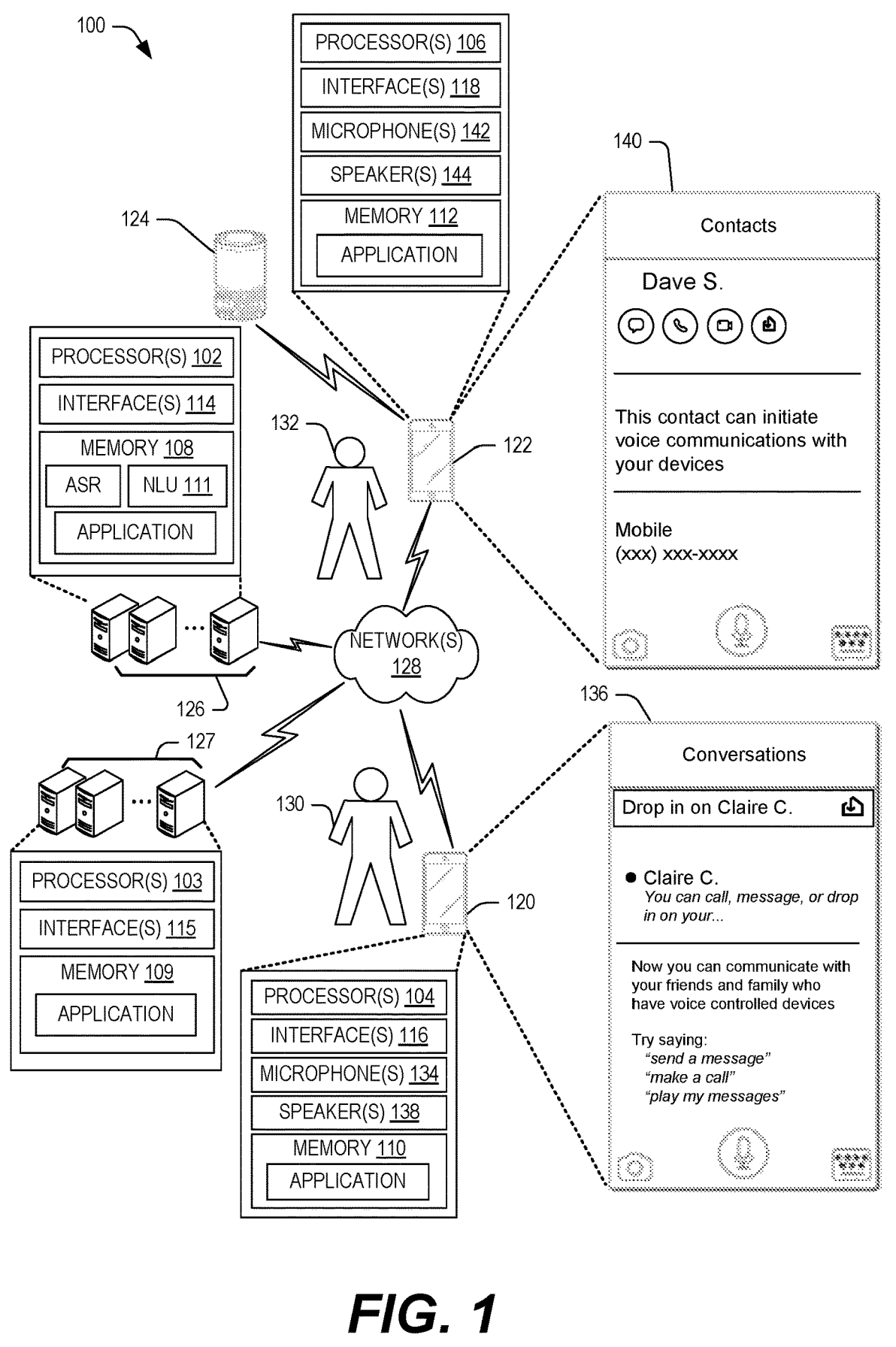

100

PROCESSOR(S) 106

INTERFACE(S) 118

MICROPHONE(S) 142

SPEAKER(S) 144

MEMORY 112

APPLICATION

124

140

Contacts

Dave S.

This contact can initiate voice communications with your devices

Mobile
(xxx) xxx-xxxx

PROCESSOR(S) 102

INTERFACE(S) 114

MEMORY 108

ASR | NLU 111

APPLICATION

132

122

NETWORK(S) 128

126

127

PROCESSOR(S) 103

INTERFACE(S) 115

MEMORY 109

APPLICATION

130

120

136

Conversations

Drop in on Claire C.

● Claire C.
*You can call, message, or drop in on your...*

Now you can communicate with your friends and family who have voice controlled devices Try saying:
*"send a message"*
*"make a call"*
*"play my messages"*

PROCESSOR(S) 104

INTERFACE(S) 116

MICROPHONE(S) 134

SPEAKER(S) 138

MEMORY 110

APPLICATION

FIG. 1

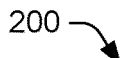
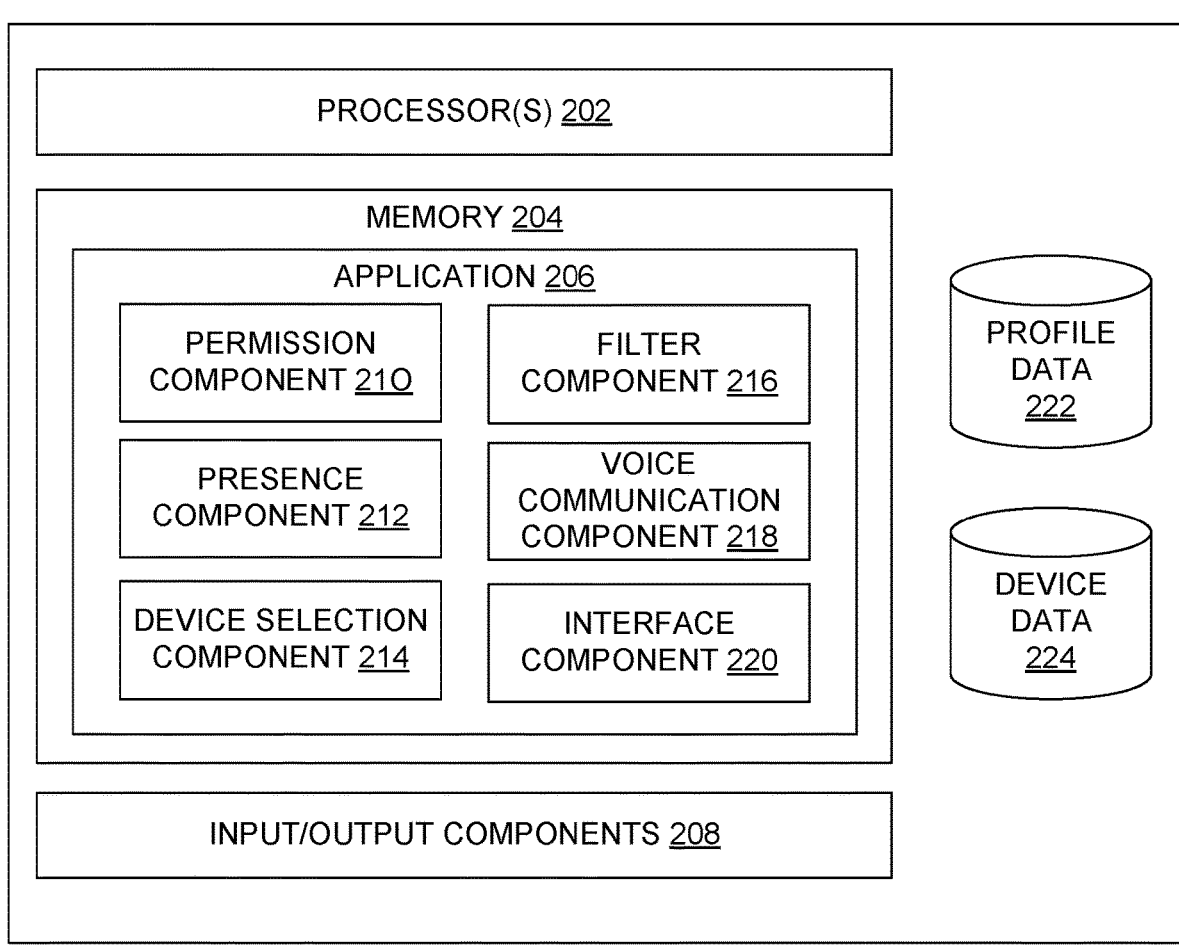
FIG. 2

700

800

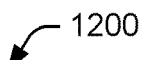

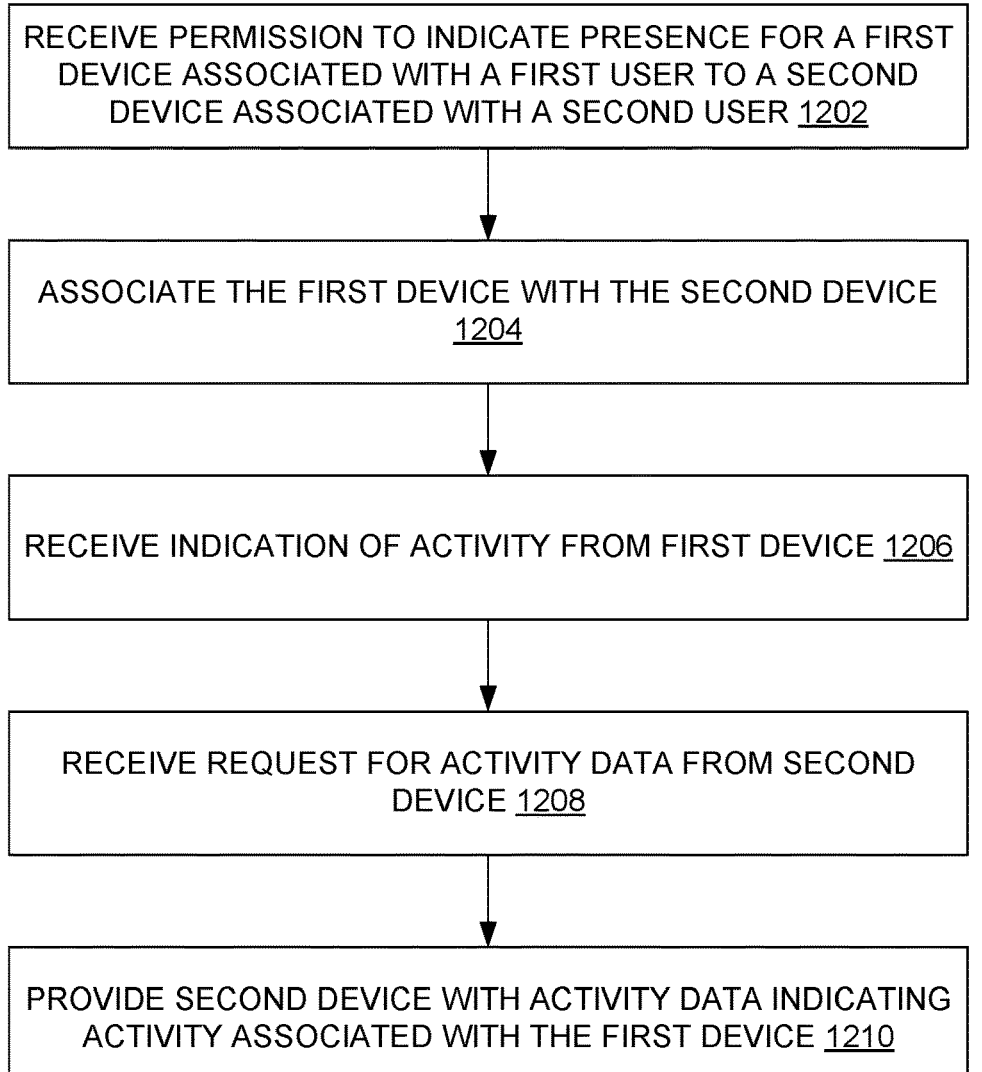

RECEIVE PERMISSION TO INDICATE PRESENCE FOR A FIRST DEVICE ASSOCIATED WITH A FIRST USER TO A SECOND DEVICE ASSOCIATED WITH A SECOND USER 1202

ASSOCIATE THE FIRST DEVICE WITH THE SECOND DEVICE 1204

RECEIVE INDICATION OF ACTIVITY FROM FIRST DEVICE 1206

RECEIVE REQUEST FOR ACTIVITY DATA FROM SECOND DEVICE 1208

PROVIDE SECOND DEVICE WITH ACTIVITY DATA INDICATING ACTIVITY ASSOCIATED WITH THE FIRST DEVICE 1210

*FIG. 12*

VOICE COMMUNICATION TARGETING USER INTERFACE

CROSS REFERENCE TO RELATED APPLICATION

This patent application is a continuation of and claims priority to U.S. patent Ser. No. 17/549,415, filed Dec. 13, 2021, which is a continuation of and claims priority to U.S. patent Ser. No. 16/797,592, filed Feb. 21, 2020, now known as U.S. Pat. No. 11,204,685, which issued on Dec. 21, 2021, which is a continuation of and claims priority to U.S. patent application Ser. No. 15/632,279, filed Jun. 23, 2017, now known as U.S. Pat. No. 10,572,107, which issued on Feb. 25, 2020, the entire contents of which are incorporated herein by reference.

BACKGROUND

Voice-controlled devices have gained popularity based in part on improvements in automated speech recognition and natural language understanding algorithms and the convenience provided by these devices which allow hands-free operation. During operation, a voice-controlled device receives, via one or more microphone, spoken commands from a user. The voice-controlled device then processes the spoken commands locally, with remote processing assistance, or both, and generates a response or performs an action. The voice-controlled device may then provide the response, such as by outputting audible sound via a speaker or by performing the action (e.g., playing music, etc.). Some voice-controlled devices may be stand-alone devices with few or no physical controls and possibly without a display, unlike standard mobile telephones.

Like many mobile telephones, voice-controlled devices may execute applications to enable execution of various tasks, such as responding to questions, playing music, ordering products, and/or performing other tasks. The voice-controlled device may share information with other devices, which may or may not be voice-controlled, via a Wi-Fi network.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 is a schematic diagram of an illustrative environment to provide voice communications with at least some voice-controlled devices.

FIG. 2 is a block diagram of an illustrative computer architecture to provide one or more voice communication targeting user interface.

FIG. 12 is a flow diagram of an illustrative process to share recent activity information associated with a device configured for voice communications.

DETAILED DESCRIPTION

Figure 3:
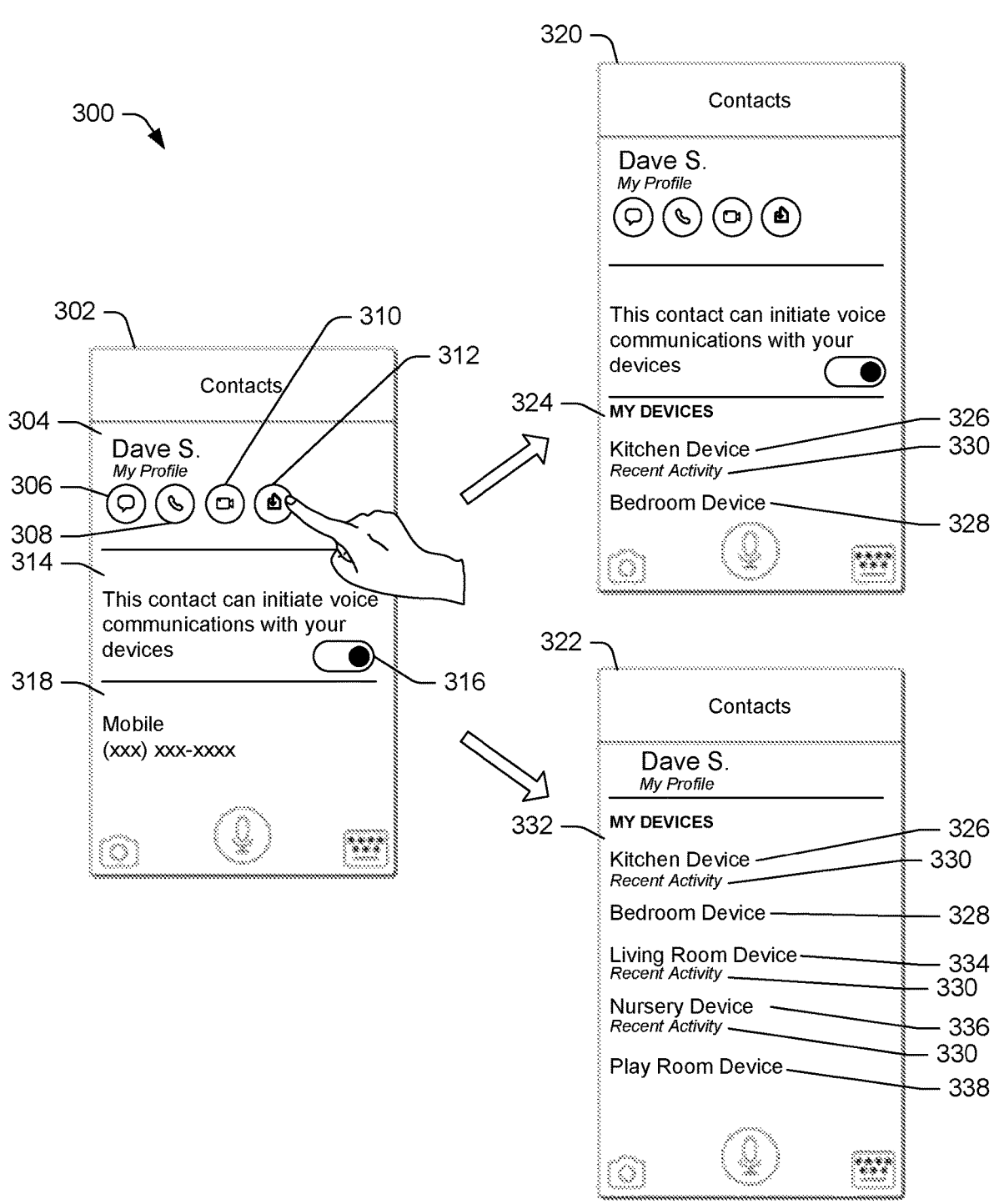
FIG. 3 is a schematic diagram of illustrative user interfaces depicting access from a contact card to representations of devices configured for voice communication.

This disclosure is directed to generating user interfaces to enable users to initiate voice-communications with voice-controlled devices via a Wi-Fi network or other network via an Internet Protocol (IP) address. The user interfaces may be provided on and/or generated by devices that include a display, such as mobile telephones, tablets, laptop computers, or other devices configured to display a user interface.

The user interface may include controls to enable users to initiate voice communications over an Internet Protocol using a session intension protocol (SIP), a real-time transport protocol (RTP), Voice over Internet Protocol (VOIP), or other protocol to facilitates sending/receiving audio, video, text or other multimedia data, including voice calls, audio messages, video calls, video messages, and/or other voice-based communications with devices that do not have connectivity with traditional mobile telephone networks, such as traditional circuit transmissions of a Public Switched Telephone Network (PSTN). For example, the user interface may enable initiating a voice communication with a voice-controlled device that includes network connectivity via a home Wi-Fi network.

The voice-controlled device may be one of a plurality of voice-controlled devices in the home, where the devices may include different names and be located in different rooms, for example. In an example configuration, a user may have a first device "Kitchen Device" located in the user's kitchen, a second device "Living Room Device" located in the user's living room, and so forth. These devices may be configured for voice communications with one another, with devices registered (or associated) with a same user profile or same user account, and/or with external devices that are not registered with a same user profile or same user account, which are associated with permissions to enable such secure voice communications from specified contacts. Thus, an operator (user) of a voice-controlled device may determine whether or not to allow other devices to have access to initiate voice communications with the voice-controlled device, and which users are granted such permissions.

The voice-controlled devices may be grouped as devices being registered under a common profile (or account), referred to herein as "household devices" and devices that are not registered under the common profile, referred to herein as "contacts devices". Devices registered under a common profile may be assumed to have permission to receive voice communications from other devices also registered under the common profile. For example, a common profile may include registration of a kitchen device, a living room device, a user first users' mobile telephone, a second user's mobile telephone, and possibly other devices. While the mobile telephones may be mobile (e.g., operate using battery power), at least some of the other devices may not be mobile and may be generally constrained to a particular area of a house or other dwelling or location. When devices do not share a common profile, then communication between devices is contingent on existence of permissions that enable voice communications and/or other data sharing. The permissions may be granted via a device based on user input (e.g., affirmative granting of a permission for a specific contact or group of contacts). As discussed below, the inclusion or exclusion of a device from a common profile may result in inclusion or suppression of some information for various purposes, including privacy purposes.

In various embodiments, the voice-activated device and/or other device configured for voice communications may be associated with data that indicates recent activity with a user. Recent activity may indicate presence of a user, such as by analysis of imagery captured by a camera of a device, receipt of voice commands by a user, such as by signals captured by a microphone of a device, and/or physical interaction with a device, such as by selection of buttons or controls of a device. Recent activity may be defined based on an amount of time since a last activity, which may depend on a type of activity, a type of device, and/or other factors. For example, a definition of recent activity may use a first threshold amount of time for a first detection type (e.g., video), and a second threshold amount of time for a second detection type (e.g., voice via a microphone). In some embodiments, the recent activity may indicate activity with a user in a last number of seconds or minutes, where the number of seconds or minutes is a predetermined amount of time (e.g., activity in the last five minutes, etc.).

A device may report occurrence of recent activity to an intermediate device (e.g., central system, etc.) or other device, which may provide this information to the other device subject to permissions, as discussed above. For example, a first user having a first device that is granted permission to communicate with a second device of a second user may provide "recent activity" information to the first device based on activity by the second user with the second device. Recent activity may be presented by a user interface to inform a user of device more likely accessible by end recipients (e.g. by the second user). When a device includes recent activity, it may be assumed more likely that a user will be present to engage in voice communications via the device than when no recent activity is available or known. Recent activity may be reported by device or by an aggregate grouping, such as for a contact. Recent activity may be used to select a device for connection of a voice communication from a plurality of device, among other possible factors, such as availability of a device (e.g., not currently in use), prior use for voice communications, and/or other factors.

In accordance with one or more embodiments, the user interface may enable voice connectivity to other devices configured for voice communications. The user interface may indicate recent activity associated with a contact (e.g., a user having a different registered profile) and/or specific device (e.g., a device having a common registered profile). The user interface may indicate availability of devices and/or contacts. For example, a device may be available for a voice communication when the device is not otherwise used for other purposes (e.g., currently on a voice communication, etc.), when the device is registered with a common profile of an initiating device that provides the user interface, and/or the device provided permission to enable voice communications with the deice that provides the user interface.

The techniques, systems, and user interfaces described herein may be implemented in a number of ways. Example implementations are provided below with reference to the following figures.

FIG. 1 is a schematic diagram of an illustrative environment 100 to provide voice communications with at least some voice-controlled devices. The environment 100 may include one or more processors. As used herein, a processor, such as processor(s) 102, 103, 104, and/or 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 102, 103, 104, and/or 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 102, 103, 104, and/or 106 may possess its own local memory, which also may store program components, program data, and/or one or more operating systems.

The environment 100 may also include memory 108, 109, 110, and/or 112. The memory 108, 109, 110, and/or 112 may include volatile and nonvolatile memory, removable and non-removable media implemented in any method or technology for storage of information, such as computer-readable instructions, data structures, program component, or other data. The memory 108, 109, 110, and/or 112 may include, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 108, 109, 110, and/or 112 may be implemented as computer-readable storage media ("CRSM"), which may be any available physical media accessible by the processor(s) 102, 103, 104, and/or 106 to execute instructions stored on the memory 108, 109, 110, and/or 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

In various embodiments, functional components may be stored in the respective memories, or the same functionality may alternatively be implemented in hardware, firmware, application specific integrated circuits, field programmable gate arrays, or as a system on a chip (SoC). In addition, each respective memory, such as the memory 108, 109, 110, and/or 112, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

Network interface(s) 114, network interface(s) 115, network interface(s) 116, and network interface(s) 118 may enable communications between a first device 120, a second device 122, a third device 124, a remote system 126, and a communication system 127, as well as other networked devices. Such network interface(s) can include one or more network interface controllers (NICs) or other types of transceiver devices to send and receive communications over a network.

For instance, each of the network interface(s) 114, network interface(s) 115, the network interface(s) 116, and the network interface(s) 118 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (Wi-Fi), or any other PAN communication protocol. Furthermore, each of the network interface(s) 114, network interface(s) 115, the network interface(s) 116, and the network interface(s) 118 may include a wide area network (WAN) component to enable communication over a wide area network. A network 128 may represent an array of wired networks, wireless networks, such as Wi-Fi, or combinations thereof.

In some instances, the remote system 126 and the communication system 127 may be local to an environment associated the first device 120, the second device 122, and/or the third device 124. For instance, the remote system 126 and/or the communication system 127 can be located within the third device 124. In some instances, some or all of the functionality of the remote system 126 and/or the communication system 127 may be performed by one or more of the first device 120, the second device 122, or the third device 124.

As described herein, the remote system 126 may be perform speech processing and at least some execution of commands, such as sending information to the communication system 127 for further processing. The communication system, meanwhile, may perform management of data and sending of voice/video data in a synchronous manner (live audio/video calls) or asynchronous manner (e.g., text, recorded audio/video messages). The communication system 127 may manage contact lists (and associated social graphs), which devices have presence indicators indicating recent activity, and drives a user interface that enables user to access voice communications and/or other types of communications facilitated by the communication system 127. In various embodiments, the remote system 126 and the communication system 127 may share resources and/or be combined at least partly.

In some instances, the remote system 126 may be configured to receive, from the first device 120 associated with a first user 130, audio data corresponding to user speech. The user speech may include a message directed to a second user 132 associated with a second user profile and/or account and/or the second device 122. The audio data may be generated by at least one microphone 134 associated with the first device 120. The audio data may include data representing the user speech and other sounds, such as, for example, background noise. In some instances, the user speech may be a message directed to the second user 132 and/or the second user profile and/or account of the second device 122.

In various embodiments, the messages may be voice communications, which may be transmitted to other devices (e.g., the second device 122, the third device 124, etc.) as part of voice communication, via the communication system 127, where users converse in real time or near real time. For example, the first device 120 may initiate a voice conversation with the third device 124, via the communication system 127, while relying, at least in part, on exchange of data via a Wi-Fi network. To initiate the voice communication, a profile associated with the first device 120 is provided a permission to the communication system 127 to initiate a voice communication with the third device, which may be provided by a user of the third device that manages access rights (e.g., via a profile associated with the third device) to the communication system 127. To initiate a voice conversation, a user of the first device 120 may interact with a first user interface 136 that provides availability information associated with the third device 124 and supplied by the communication system 127. For example, the user interface may provide a control that allows the first user to "drop in" and initiate a voice communication, via the communication system 127, with the third device 124. To initiate the communication, the first device 120 may transmit a request to the third device 124, possibly via the communication system 127. The communication system 127 and/or the third device 124 may receive the request and may grant permission or otherwise initiate voice communications via a VoIP application or via use of other communication software operating on the first device and the third device that facilitates a voice conversation (e.g., transmitting packets of audio data between the devices for replay on the respective devices to enable users to converse in real time or near real time). For example, microphones 134 and speakers 138 of the first device 120 may be used to enable the voice communication interaction with the first user while corresponding hardware may be used by the third device 124. Meanwhile, a second user may interact with a second user interface 140 to initiate other voice conversations with other devices available to the second user, such as by way of permissions, associations with common profiles, and so forth. The second device 122 may include microphones 142 and speakers 144 to accommodate voice communications with other devices. Additional details about the communication system 127 are described below with reference to FIG. 2.

In some embodiments, the remote system 126 may be configured to analyze the audio data to create a transcription of the user speech, such as to initiate commands, generate text, and/or for other reasons. The remote system 126 may provide data to the communication system 127, and vice versa, to perform complementary operations to assist users in performing tasks, such as the tasks described herein including voice communications. For example, once the audio data is received from the first device 120, the portion of the audio data corresponding to the user speech may be separated from other components of the audio data, such as, for example, background noise. Automatic speech recognition (ASR) techniques may be used to determine words making up the user speech. For example, ASR techniques may include generation of a list that includes the most likely words or phrases spoken by the user, an "N-best list" for example, and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings.

Following ASR processing, the ASR results may be sent by a speech recognition engine to other processing components, which may be local to the device performing ASR and/or distributed across the network(s). For example, ASR results in the form of a single textual representation of the speech, an N-best list including multiple hypotheses and respective scores, lattice, etc. may be sent to the remote system 126, for natural language understanding (NLU) processing, such as conversion of the text into commands for execution, either by the user device, by the remote system 126, or by another device (such as a server running a specific application like a search engine, etc.).

The device performing NLU processing (e.g., a server, etc.) may include various components, including potentially dedicated processor(s), memory, storage, etc. An NLU component 111 may include a recognizer that includes a named entity recognition (NER) component which is used to identify portions of query text that correspond to a named entity that may be recognizable by the system.

Generally, the NLU process takes textual input (such as processed from ASR based on the utterance input audio) and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device to complete that action. For example, if a spoken utterance is processed using ASR and outputs the text "send a message to Joe: Hi Joe, Congratulations . . . " the NLU process may determine that the user intended that the user device capture speech of the user for sending, as an audio file, for output on a device of "Joe."

The NLU may process several textual inputs related to the same utterance. For example, if the ASR outputs N text segments (as part of an N-best list), the NLU may process all N outputs to obtain NLU results.

The NLU process may be configured to parsed and tagged to annotate text as part of NLU processing. For example, for the text "Send a message to Joe," "send a message" may be tagged as a command (to generate an audio file and send it for output) and "to Joe" may be tagged as a specific entity associated with the command.

To correctly perform NLU processing of speech input, an NLU process may be configured to determine a "domain" of the utterance so as to determine and narrow down which services offered by the endpoint device (e.g., the remote system, a user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

A named entity recognition (NER) component may receive a query in the form of ASR results and attempts to identify relevant grammars and lexical information that may be used to construe meaning. To do so, the NLU component 111 may begin by identifying potential domains that may relate to the received query. An NLU storage may include a database of devices identifying domains associated with specific devices. For example, the user device may be associated with domains for music, telephony, calendaring, contact lists, and device-specific communications. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer, language model and/or grammar database, a particular set of intents/actions, and/or a particular personalized lexicon.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music or other information. The responses based on the query produced by each set of models is scored, with the overall highest ranked result from all applied domains is ordinarily selected to be the correct result.

FIG. 2 is a block diagram of an illustrative computer architecture 200 to provide one or more voice communication targeting user interface. The computing architecture 200 may represent the communication system 127. The computing architecture 200 may be implemented in a distributed or non-distributed computing environment.

The computing architecture 200 may include one or more processors 202 and memory 204 (also referred to herein as "computer readable media") that stores various components, applications, programs, or other data. The memory 204 may include instructions that, when executed by the one or more processors 202, cause the processors to perform the operations described herein for the communication system 127.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of media/ machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the memory 204 may store an application 206. The application 206 may enable data communications via one or more input/output components 208, such as microphone(s), speakers(s), display(s), and/or other input/output devices. The application 206 may include a permission component 210, a presence component 212, a device selection component 214, a filter component 216, a voice communication component 218, and an interface component 220, which are described in turn. The components may be stored together or in a distributed arrangement. In some embodiments, the computing architecture 200 may include or have access to profile data 220 and device data 222. The profile data 222 may include account information, which may be used to determine and store preferences, permissions, and/or other user data. The device data 224 may include connectivity information, such as IP address information, hardware information, and/or other device data that may be used to enable communication between different devices.

The permission component 210 may enable a device to grant a permission for voice communications, performed via the voice communication component 218, with a specified device and/or specified profile. For example, a user that manages a profile for a first device may grant a permission for a second device associated with a second profile to have access to initiate voice communications with the first device. In some embodiments, the permission may specify whether to enable reporting of recent activity, which may be performed at least in part by the presence component 212 discussed below. The permission component 210 may store permission data in the profile data 222, in the device data 224, or both, which may be used to use, maintain, and enforce the permissions. The permissions may be revoked at a later time via the permissions component 210 by an authorized user (e.g., the first user in the example above). The permission component 210 may manage contacts (e.g., devices having permissions to perform voice communications). Thus, once a permission is created/granted via the permission component 210, the permission component may create a relationship between the contacts and/or devices, which may be stored in the profile data 222 and/or the device data 224 and used by the interface component 220 in generation of the user interfaces described herein. In some embodiments, a first representation is associated with a first device. The first representation indicates a first availability of the first device and recent activity associated with the first device, wherein the first representation is selectable via the user interface to cause the system to initiate a synchronous communication session that is accepted by the first device based at least in part on previously configured permission setting associated with the first device and stored remotely from the first device.

The presence component 212 may determine whether a device has recent activity, such as activity in a last number of seconds, minutes, or some other predetermined amount of time. The presence component 212 may determine recent activity based on signals captured by one or more sensors of a device, such as microphone(s), camera(s), input controls, accelerometers, and/or other sensors. For example, the presence component 212 may analyze imagery captured by a camera to determine presence of a user and/or movement indicating presence of a user. The presence component 212 may determine presence of a user based on sounds captured by a microphone and analyzed as audio data. The presence component 212 may provide a time stamp with data associated with human presence or likely associated with human presence. The presence component 212 may transmit this information to a central system for dissemination to other devices having permissions to access such data, or directly to the other devices that have the permissions to access the recent activity data. This data may be used by the other devices to indicate recent activity of the first device (or other reporting device) while the activity is within predefined parameters for recent activity (e.g., within a threshold amount of time). For example, the presence component 212 of a first device may indicate human activity at 2:14:31 pm (h:mm:ss). This data may be sent to a second device and received at 2:14:45 pm. The second device may indicate that the first device has recent activity at least until the time different between the current time and 2:14:31 pm is greater than a threshold amount of time, absent a newer indication of recent activity from the first device.

The device selection component 214 may select a device for a voice communication with a requesting device when multiple devices are available for selection. For example, a first user may use a first device to initiate a conversation with a second user. The second user may be associated with multiple devices. In some embodiments, the first user device may not be provided an option for selection or possibly and information about the different devices controlled by the second user. Instead, the first device may provide a generic ability to access the second user as a contact of the first user, where the selection of the device of the second user, after initiation of a voice communication request, is selected by the device selection component 214. The device selection component 214 may employ one or more rules for selecting device to initiate for a voice communication. The rules may select a device associated with recent activity before selecting a device that does not have recent activity (as determined by the presence component 212). The rules may avoid selecting a device that is not available, such as because a device is on another call or unavailable for other reasons (e.g., disconnected, reporting an error, performing other actions, etc.). In some instances, the rules may apply a tie breaker to select a device, such as when multiple devices have recent activity or when no device has recent activity. A tie breaker may select a device last used for a voice communication or used more frequently for voice communications, for example. Of course, the device selection component 214 may apply other rules to select a device for the voice communication, possibly selecting the device based on information stored in the profile data 222, such as a user selection of a preferred device.

The filter component 216 may filter devices available for voice communications based on filter criteria. In some embodiments, the filter component 216 may apply a filter to cause the user interface to suppress devices without recent user activity, and thus present devices for selection that include recent activity. By applying this filter (or other filters), the filter component 216 may provide a user information with information that may more readily enable a voice communication with another device.

The voice communication component 218 may include executable code to facilitate data sharing to accomplish and implement a voice communication between devices. For example, the voice communication component 218 may be implemented as a VoIP software that enables voice communication between devices in real time or near real time. The voice communication may be synchronous communication session or asynchronous communication session and may include video in some instances. A synchronous communication session may be use an Internet Protocol, such as SIP, RTP, and/or other Internet Protocols to facilitate exchange of voice data in real-time or near-real-time to enable the voice communication. For example, the voice communication may include a recorded video having voice and imagery, a recorded audio message, a synchronous video call, or a synchronous voice call, which may be facilitated using an Internet Protocol such as SIP, RTP, VOIP, etc., and without sole reliance on a PSTN. The voice communication component 218 may be integrated in an operating system of a device, at least in part, to enable the voice communications. However, the voice communication component 218 may be implemented as a stand-alone component that is not integrated with the operating system of a device. The voice communication component 218 may select a device based on information from the device selection component 214 to connect two devices in a voice communication. In some embodiment, the voice communication component 218 may enable additional devices to be connected in a voice communication such that three or more devices are included in a same voice communication, such as to form a conference call or bridge.

The interface component 220 may generate the user interface to enable users of device to select controls to cause a device to initiate the voice communications via the voice communication component 218. The interface component 220 may provide interface features (e.g., text, color, icons, and/or other visual effects) and/or controls to provide information to users. The information may be generated in part by the permission component 210, the presence component 212, the device selection component 214, and/or the filter component 216. Various embodiments of illustrative user interfaces are shown in FIGS. 3-10 below. The interface component 220 may generate these user interfaces and other variations of user interfaces, possibly using information from various components described herein.

In accordance with various embodiments, the application 206 may perform one or more algorithms as follows. If a single device (the device a user is using to drop in), the user will be told the contact isn't available, because no other device is available for drop in. If there is more than one device, (excluding the device the user is using), the following may occur. If a presence is detected from a single device, the application may drop in on that device. If presence is detected from multiple devices, the application may drop in on the device that is historically most active. If no device is present, the application may drop in on the device that is historically most often active. If there is no historical presence data, the application may sort the devices first based on device type and then on the registration date. ("FirstTimeRegistered").

FIG. 3 is a schematic diagram of illustrative user interfaces 300 depicting access from a contact card to representations of devices configured for voice communication. A first user interface (UI) 302 may include a user's own contact card, which may enable access to devices that share a common profile with the user.

The first UI 302 may include a communication section 304 that includes communication controls to initiate different types of communications. The communication section 304 may include a text control 306 to initiate a text-based message with a device associated with the contact. The communication section 304 may include a standard call control 308 that may enable a PSTN-based call with a device associated with the contact. The communication section 304 may include a video control 310 that may enable a video call with a device associated with the contact. The communication section 304 may include a voice communication control 312 (also referred to herein as a "drop in control") that may cause the communication device 127 to facilitate a voice call with a device associated with the contact. For example, the communication device 127 may cause presentation of the voice communication control 312 when a device is detected, via the application 206. The communication device 127 may determine devices are available for a voice communication in response to identifying contact and/or device relationships, which may be stored in the profile data 222 and/or the device data 224 shown in FIG. 2.

The first UI 302 may include a permission section 314. The permission section 314 may include a permission control 316 to enable the user to grant permission to a contact, via the permission component 210, to enable voice communications using a similar control as the voice communication control 312, and thus initiate a voice communication with a device associated with the user, via the voice communication component 218. The first UI 302 may also include a contact data section 318, which may include contact information for the contact, such as telephone numbers, addresses, notes, and so forth.

Activation or selection of the voice communication control 312 may cause the interface component 220 to update the user interface (or presenting a new user interface) as shown in a second UI 320 or a third UI 322, depending on a number of devices available for connection. The second UI 320 includes a target devices section 324 that provides a target devices that may be used in the voice communication. The communication system 127 may identify the target device as devices that include permissions associated with "Dave S." as managed via the permission component 210, and based on data received from various devices (e.g., are the devices "online", and available, etc.). The target devices may perform a voice communication using the voice communication component 218, which may enable voice communications without use of a PSTN-based device, such as using a VoIP protocol or other similar protocol. The target devices may be voice controlled devices and may not include components such as displays and may have few or no physical controls (buttons). However, the target devices may represent different types of devices, some possibly being PSTN-based devices capable of communicating via a PSTN and via the voice communication component 218. As shown in the second UI 320, the target devices section 324 may include a first device 326 that includes a first name "kitchen device" and a second device 328 that includes a second name "bedroom device". The names of the devices may be designated by an administrator of the devices, such as a user that can modify the common profile that the devices share, as described above. In some embodiments, a device may include a recent activity indicator 330, managed by the presence component 212, that indicates recent activity of a corresponding device (e.g., of the first device 326 as shown in the second UI 320). The recent activity indicator 330 may be generated by the presence component 212, such as based on detected activity of the corresponding device within a last threshold amount of time (e.g., a last five minutes or other amount of time).

The third UI 322 may include an expanded target devices section 332 when a number of devices exceeds a threshold amount of devices. As shown in FIG. 3, the expanded target devices section 332 includes more area in a UI than the target devices section 324, and therefore enables listing of more devices. As shown in the third UI 322, the expanded target devices section 332 includes the first device 326, the second device 328, a third device 334, a fourth device 336, a fifth device 338, and possibly more devices. Some devices may be associated with the recent activity indicator 330 in embodiments that use the presence component 212 or have access to presence data from the presence component 212.

Figure 4:
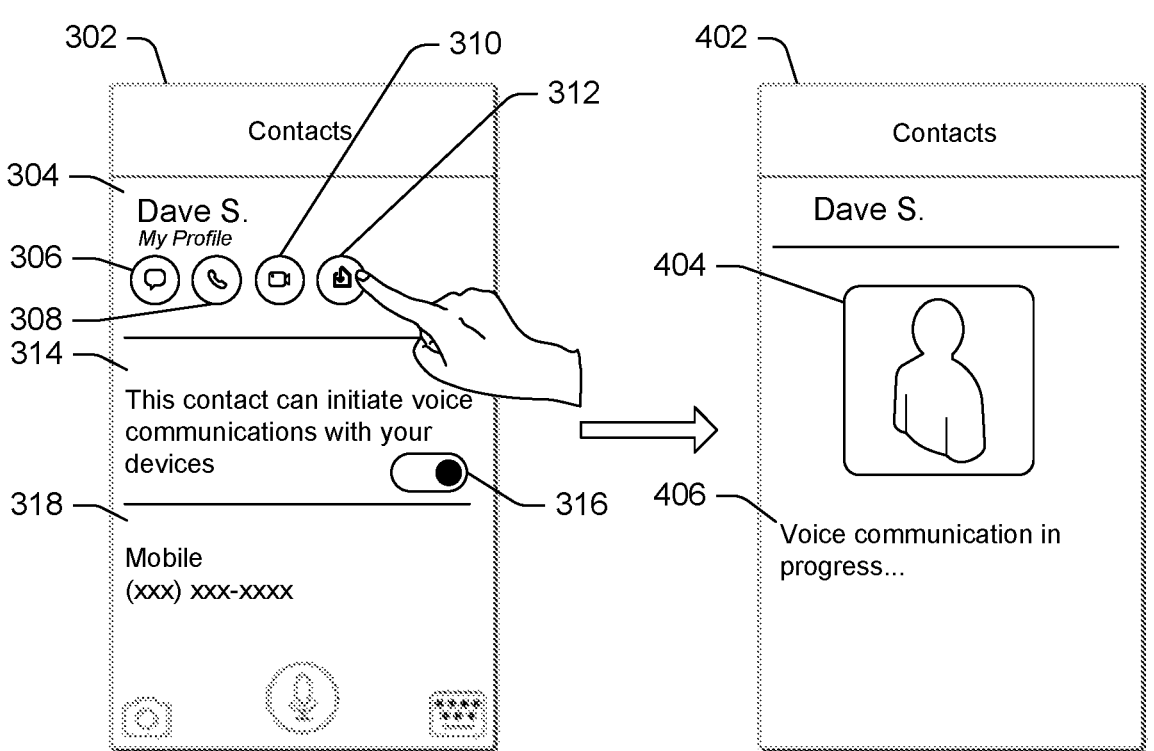
FIG. 4 is a schematic diagram of illustrative user interfaces depicting access from a contact card to a voice communication.

FIG. 4 is a schematic diagram of illustrative user interfaces 400 depicting illustrative access from a contact card to a voice communication. The UIs 400 include the first UI 302 that includes the voice communication control 312. Activation or selection of the voice communication control 312 may cause the interface component 220 to update the user interface as shown in a fourth UI 402. Besides providing a new presentation of information, activation or selection of the voice communication control 312 may initiate the voice communication with a selected device, such as by causing the voice communication component 218 to initiate and/or facilitate a voice communication between two more devices. In this example, the contact may only have a single device available for voice communications via the voice communication component 218. Rather than providing a list of selectable target devices, as provided in the second UI 320 and the third UI 322 (shown in FIG. 3), the voice communication component 218 may initiate the voice communication without an explicit user-selection of a target device since there is only a single device available in this example.

The fourth UI 402 may include an image 404, which may be an image or picture of the contact, an icon, and/or another type of graphical representation associated with the target device. The fourth UI 402 may include an information section 406 that may include information associated with the voice communication, such as connection status (e.g., connecting, connected, disconnected, etc.), a duration of the communication, members of the communication (possibly more than two if a conference call), and/or other relevant information.

Figure 5:
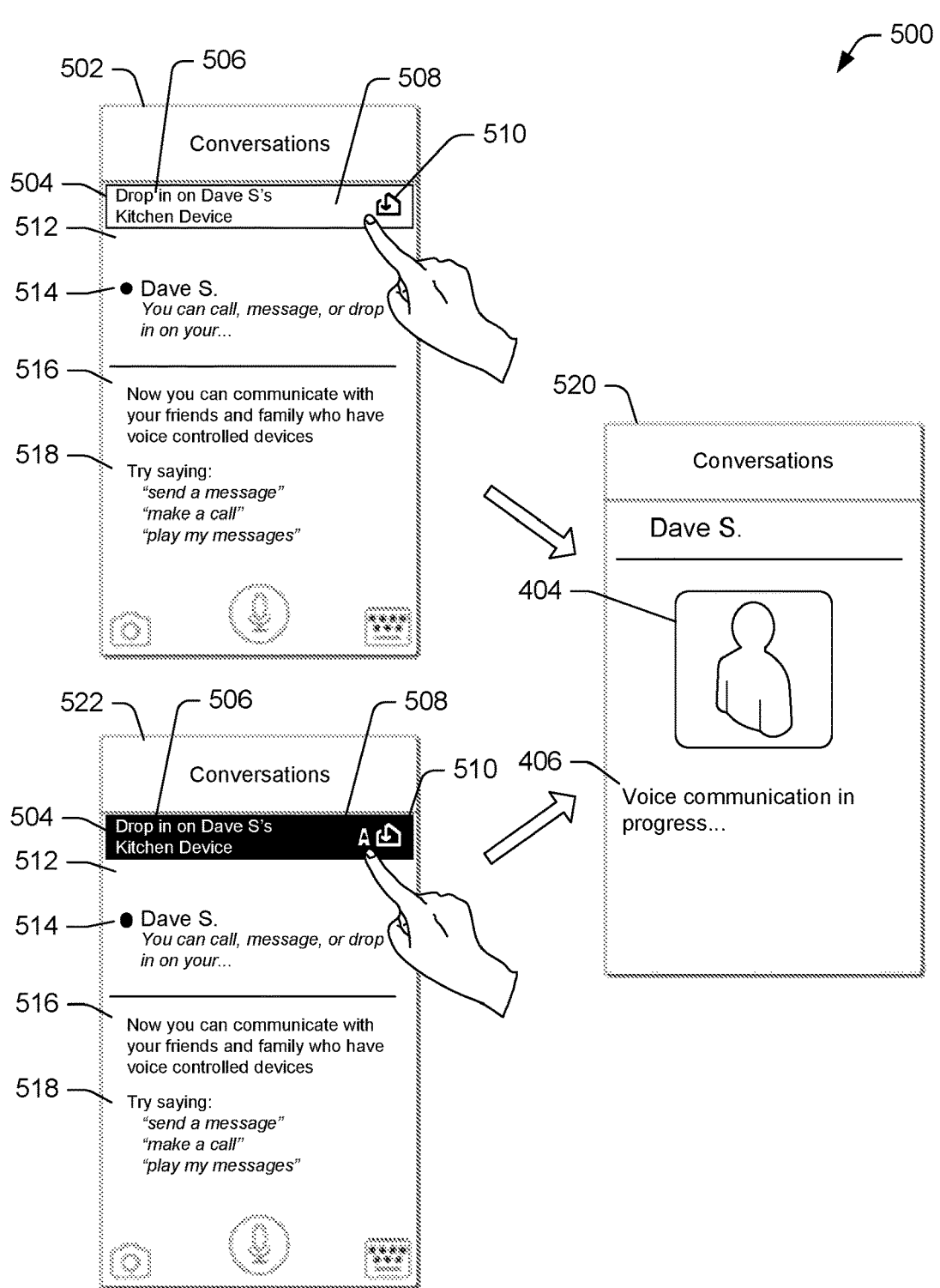
FIG. 5 is a schematic diagram of illustrative user interfaces depicting access from a conversation interface to a specific available voice communication, where the access may indicate recent activity associated with a corresponding device configured to receive a voice communication.

FIG. 5 is a schematic diagram of illustrative user interfaces 500 depicting access from a conversation interface to a specific available voice communication, where the access may indicate recent activity associated with a corresponding device configured to receive a voice communication. The conversation interface may provide access to conversations, such as text-based conversations or other types of conversations involving contacts of a user.

A fifth user interface (UI) 502 may include a control bar 504 that, when activated or selected, may cause initiation of a voice communication with a device. The control "bar" may represent a panel, an icon, a button, and/or any other selectable portion of the user interface that enables access to a voice communication or an intermediate user interface associated with a voice communication, as described herein. The control bar 504, unlike the voice communication control 312 (shown in FIGS. 3-4), may provide additional information about available devices for voice communications via the voice communication component 218. The additional information may be provided by way of text 506, graphical representations (e.g., color, visual effects, etc.) of the bar 508, use of one or more icon 510, and/or other interface features that provide information to a user such as an availability of devices for voice communications via the voice communication component 218.

As shown in the control bar 504 of the fifth UI 502, the information includes "Drop in on Dave S's Kitchen Device.", which is a specific device having a common profile with the user that has a device configured to perform voice communications. In this example, the user may only have a single target device that is available to perform a voice communication via the voice communication component 218, which in this example is "Dave S's Kitchen Device". In some embodiments, the control bar 504 of the fifth UI 502 may provide a name of a specific device associated with Dave S as the text 506 (e.g., "Dave S's Kitchen Device"). In various embodiments, the control bar 504 of the fifth UI 502 may include a graphical representations (e.g., a color of gray, etc.) of the bar 508 that indicates that none of the devices associated with Dave S. have recent activity as determined by the presence component 212.

The fifth UI 502 may include a conversation section 512 which may include conversations and/or information associated with one or more contacts 514. For example, the conversation may be a text-based message conversation with a contact or with multiple contacts. The fifth UI 502 may include an information section 516, which may provide information to help a user initiate a voice communication that uses the voice communication component 218, for example. The information section 516 may include sample voice commands 518 that may be helpful for the user to initiate a voice communication or perform other relevant tasks.

Activation or selection of the control bar 504 may cause the user interface to update as shown in a sixth UI 520. Besides providing a new presentation of information, activation or selection of the control bar 504 may initiate the voice communication with a selected device. In this example, the contact may only have a single device available for voice communications via the voice communication component 218. The device may initiate the voice communication without an explicit user-selection of a target device since there is only a single device available in this example.

The sixth UI 520 may include the image 404, which may be an image or picture of the contact, an icon, and/or another type of graphical representation associated with the target device. The sixth UI 520 may include the information section 406 that may include information associated with the voice communication, such as connection status (e.g., connecting, connected, disconnected, etc.), a duration of the communication, members of the communication (possibly more than two if a conference call), and/or other relevant information.

A seventh UI 522 may be similar to the fifth UI 502 and may include the control bar 504, but may include different information represented in the control bar 504 by the text 506, the graphical representations of the bar 508, and/or the icon(s) 510. In this example, the control bar 504 of the seventh UI 522 indicates recent activity of a device. The recent activity may be indicated by the graphical representations of the bar 508 (e.g., a color of blue or other color or graphical representations, etc.). The recent activity may be indicated by depiction of the icon(s) 510, such as an icon indicating recent activity (e.g., an "A" icon, etc.). The text 506 of the seventh UI 522 may indicate a specific device name that include recent activity, such as "Dave S's Kitchen Device". In this example, the contact may only have a single device available for voice communications via the voice communication component 218. The device may initiate the voice communication without an explicit user-selection of a target device since there is only a single device available in this example. Following activation or selection of the control bar 504 of the seventh UI 522 may cause the user interface to update as shown in a sixth UI 520, which may operate and provide the information described above.

Figure 6:
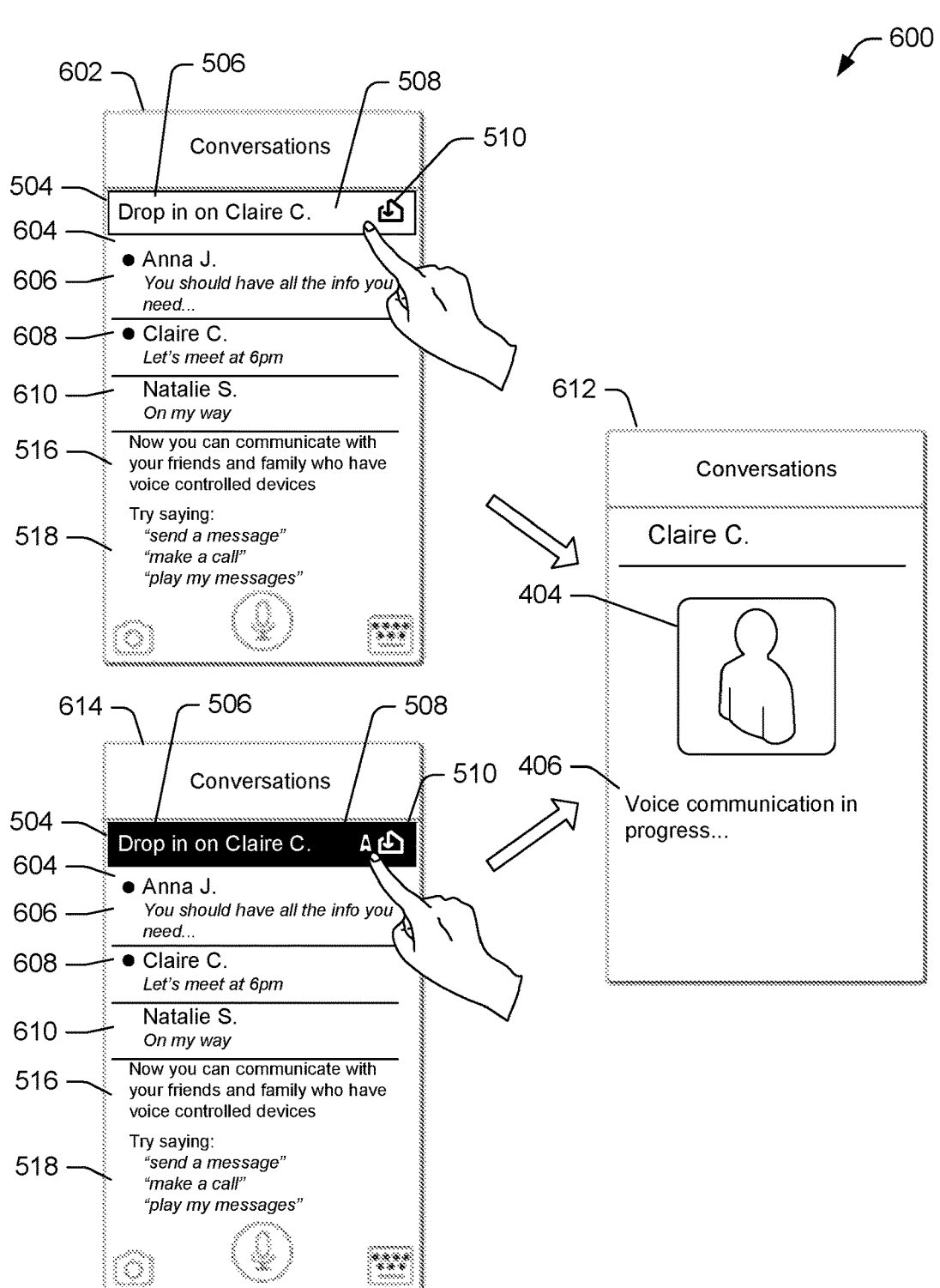
FIG. 6 is a schematic diagram of illustrative user interfaces depicting access from a conversation interface to a specific available voice communication of a contact that has granted permission for voice communications, where the access may indicate recent activity associated with a corresponding device configured to receive a voice communication.

FIG. 6 is a schematic diagram of illustrative user interfaces 600 depicting access from a conversation interface to a specific available voice communication of a contact that has granted permission for voice communications, where the access may indicate recent activity associated with a corresponding device configured to receive a voice communication. The conversation interface may provide access to conversations, such as text-based conversations or other types of conversations involving contacts of a user.

An eighth user interface (UI) 602 may include the control bar 504 that, when activated or selected, may cause initiation of a voice communication with a device. The control bar 504, unlike the voice communication control 312 (shown in FIGS. 3-4), may provide additional information about available devices for voice communications via the voice communication component 218. The additional information may be provided by way of the text 506, the graphical representations (e.g., color, visual effects, etc.) of the bar 508, use of one or more of the icon(s) 510, and/or other interface features that provide information to a user such as an availability of devices for voice communications via the voice communication component 218.

As shown in the control bar 504 of the eighth UI 602, the information includes "Drop in on Claire C.", which is a specific device that does not share a common profile with the user that has a device configured to perform voice communications. In this example, Claire C. may have multiple target devices that are available to perform a voice communication via the voice communication component 218. However, since these devices are not controlled by the user, but instead by "Claire C.", the user does not have visibility to specific device that may be connected to for the voice communication. The device information is suppressed by the UI. In fact, "Claire C." may have multiple devices that are configured for voice communications via the voice communication component 218, but the eighth UI 602 may only indicate a generic ability to connect to "Claire C." to avoid providing additional device information to the user regarding Claire C. and/or her devices or location. In some embodiments, the control bar 504 of the eighth UI 602 may provide the name of a specific contact as the text 506 (e.g., "Claire C."). In various embodiments, the control bar 504 of the eighth UI 602 may include a graphical representations (e.g., a color of gray, etc.) of the bar 508 that indicates that none of the devices associated with Claire C. have recent activity as determined by the presence component 212.

The eighth UI 602 may include a conversation section 604 which may include conversations and/or information associated with one or more contacts. For example, the conversation may be a text-based message conversation with a contact or with multiple contacts. The conversation section 604 may include a first contact 606 associated with a first conversation, a second contact 608 associated with the second conversation, and/or a third contact 610 associated with a third conversation. One of the contacts, "Claire C.", is available for a voice communication, which may be activated or selected using the control bar 504. Additional ways to initiate the voice communication may also be available.

The eighth UI 602 may include the information section 516, which may provide information to help a user initiate a voice communication that uses the voice communication component 218, for example. The information section 516 may include the sample voice commands 518 that may be helpful for the user to initiate a voice communication or perform other relevant tasks.

Activation or selection of the control bar 504 may cause the user interface to update as shown in a ninth UI 612. Besides providing a new presentation of information, activation or selection of the control bar 504 may initiate the voice communication with a selected device. In this example, the contact may only have one or more devices available for voice communications via the voice communication component 218. When multiple devices are available, the device selection component 214 may be used to select a target device for initiation of the voice communication via the voice communication component 218. The device may initiate the voice communication without an explicit user-selection of a target device since the selection may be performed by the device selection component 214 to hid or obscure at least some information about the contact from the user (e.g., information pertaining to specific devices and/or location information associated with a contact).

The ninth UI 612 may include the image 404, which may be an image or picture of the contact, an icon, and/or another type of graphical representation associated with the target device. The ninth UI 612 may include the information section 406 that may include information associated with the voice communication, such as connection status (e.g., connecting, connected, disconnected, etc.), a duration of the communication, members of the communication (possibly more than two if a conference call), and/or other relevant information.

A tenth UI 614 may be similar to the eighth UI 602 and may include the control bar 504, but may include different information represented in the control bar 504 by the text 506, the graphical representations of the bar 508, and/or the icon(s) 510. In this example, the control bar 504 of the tenth UI 614 indicates recent activity of a device. The recent activity may be indicated by the graphical representations of the bar 508 (e.g., a color of blue or other color or graphical representations, etc.). The recent activity may be indicated by depiction of the icon(s) 510, such as an icon indicating recent activity (e.g., an "A" icon, etc.). The text 506 of the tenth UI 614 may indicate a specific contact name that includes recent activity, such as "Claire C". In this example, the contact may only have one or more devices available for voice communications via the voice communication component 218. When multiple devices are available, the device selection component 214 may be used to select a target device for initiation of the voice communication via the voice communication component 218. The device may initiate the voice communication without an explicit user-selection of a target device since the selection may be performed by the device selection component 214 to hid or obscure at least some information about the contact from the user (e.g., information pertaining to specific devices and/or location information associated with a contact). As discussed above, the device selection component 214 may select the target device based on rules. The rules may prioritize selection of a device having most recent activity, for example.

The device may initiate the voice communication without an explicit user-selection of a target device. Following activation or selection of the control bar 504 of the tenth UI 614 may cause the user interface to update as shown in a ninth UI 612, which may operate and provide the information described above.

Figure 7:
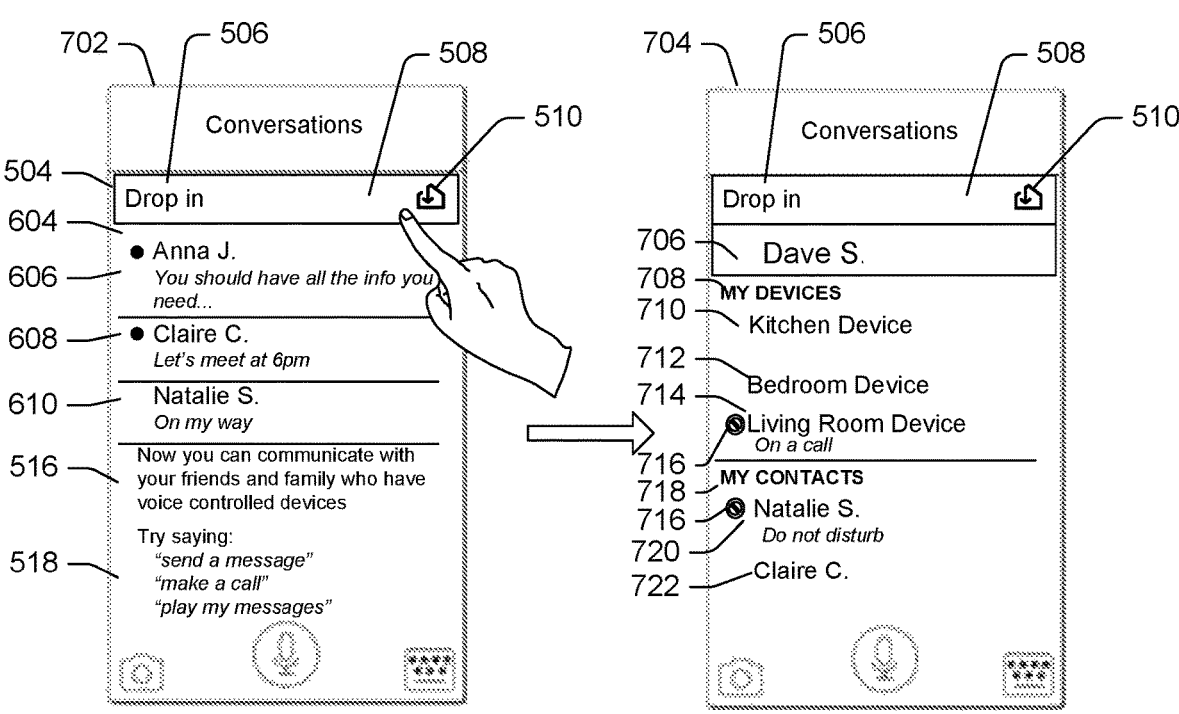
FIG. 7 is a schematic diagram of illustrative user interfaces depicting access from a conversation interface to representations of devices that are available for voice communications.

FIG. 7 is a schematic diagram of illustrative user interfaces 700 depicting access from a conversation interface to representations of devices that are available for voice communications. The conversation interface may provide access to conversations, such as text-based conversations or other types of conversations involving contacts of a user.

An eleventh user interface (UI) 702 may include the control bar 504 that, when activated or selected, may cause initiation of a voice communication with a device. The control bar 504, unlike the voice communication control 312 (shown in FIGS. 3-4), may provide additional information about available devices for voice communications via the voice communication component 218. The additional information may be provided by way of the text 506, the graphical representations (e.g., color, visual effects, etc.) of the bar 508, use of one or more of the icon(s) 510, and/or other interface features that provide information to a user such as an availability of devices for voice communications via the voice communication component 218. For example, the text 506 may include a number of devices available for voice communications or possibly other information.

As shown in the control bar 504 of the eleventh UI 702, the information includes "Drop In", which does not indicate a specific device or contact. In this example, multiple target devices may be available to perform a voice communication via the voice communication component 218. In various embodiments, the control bar 504 of the eleventh UI 702 may include a graphical representations (e.g., a color of gray, etc.) of the bar 508 that indicates that none of the devices have recent activity as determined by the presence component 212.

The eleventh UI 702 may include the conversation section 604 which may include conversations and/or information associated with one or more contacts. For example, the conversation may be a text-based message conversation with a contact or with multiple contacts. The conversation section 604 may include the first contact 606 associated with a first conversation, the second contact 608 associated with the second conversation, and/or the third contact 610 associated with a third conversation. At least some of the contacts may be available for a voice communication, which may be accessed by activation or selection of the control bar 504. Additional ways to initiate the voice communication may also be available.

The eleventh UI 702 may include the information section 516, which may provide information to help a user initiate a voice communication that uses the voice communication component 218, for example. The information section 516 may include the sample voice commands 518 that may be helpful for the user to initiate a voice communication or perform other relevant tasks.

Activation or selection of the control bar 504 may cause the user interface to update as shown in a twelfth UI 704. The twelfth UI 704 may cause presentation of available target devices that may facilitate a voice communication via the voice communication component 218. The twelfth UI 704 may include a common profile indicator 706 that indicates which common profile is represented in the twelfth UI 704, such as "Dave S.". The twelfth UI 704 may include a common profile section 708 that includes target devices having a shared profile with the user. The common profile section 708 may include a first device 710, "Kitchen Device", a second device 712, "Bedroom Device", a third device 714, "Living Room Device", and/or other devices having a common profile with the user and available for voice communications. Some devices may be temporarily unavailable for various reasons, such as devices that are on a call, set for "do not disturb", or devices performing a different operation. An icon 716 and/or other text or graphical representations may indicate devices that are not available, at least temporarily, for selection, such as via a grayed out format, etc.

The twelfth UI 704 may include a contact device section 718 that includes target devices that do not have a shared profile with the user. The contact device section 718 may include a first contact 720, "Natalie S.", a second contact 722, "Claire C.", and/or other contacts that do not have a common profile with the user and are available for voice communications. The icon 716 and/or other text or graphical representations may indicate devices that are not available, at least temporarily, for selection, such as via a grayed out format, etc. The contacts shown in the contact device section 718 may be associated with one or more devices. However, this device level information may be obscured from the user. Thus, information such as "do not disturb" may indicate that no device for "Natalie S." is currently available. Selection of a device in these instances may be performed by the device selection component 214, as discussed above.

Figure 8:
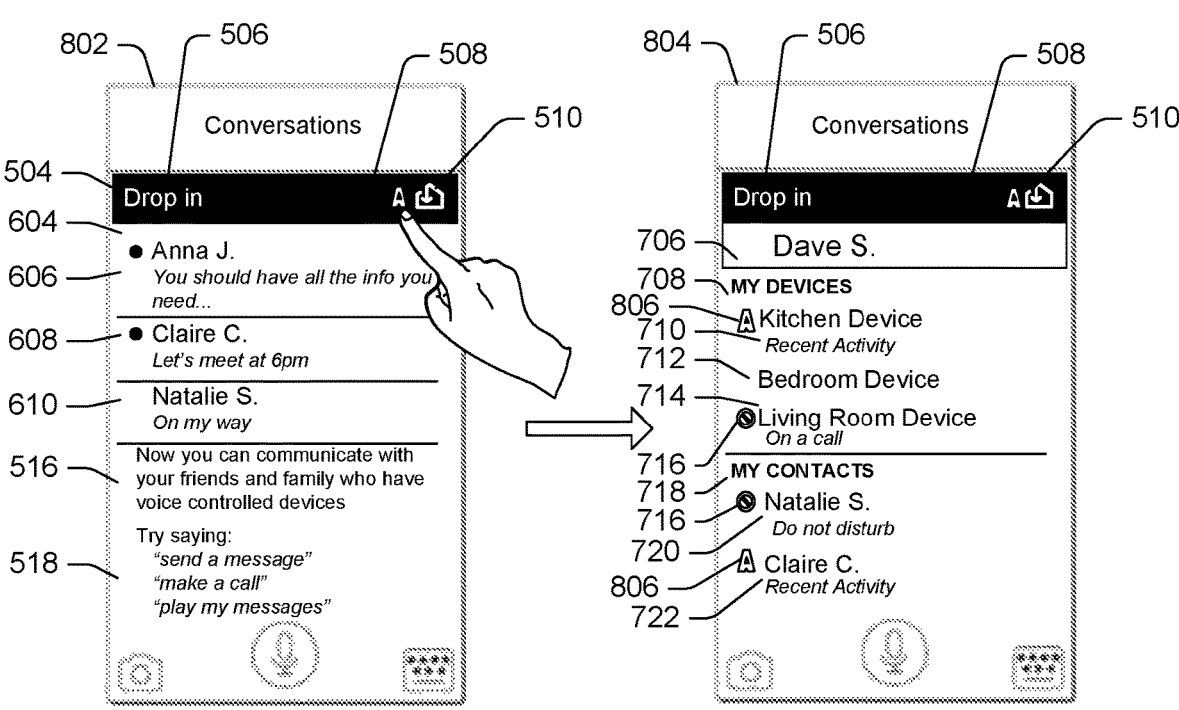
FIG. 8 is a schematic diagram of illustrative user interfaces depicting illustrative access from a conversation interface to representations of devices that are available for voice communications, where at least some representations indicate recent activity associated with a corresponding device configured to receive a voice communication.

FIG. 8 is a schematic diagram of illustrative user interfaces 800 depicting access from a conversation interface to representations of devices that are available for voice communications, where at least some representations indicate recent activity associated with a corresponding device configured to receive a voice communication. The conversation interface may provide access to conversations, such as text-based conversations or other types of conversations involving contacts of a user.

A thirteenth user interface (UI) 802 may include the control bar 504 that, when activated or selected, may cause initiation of a voice communication with a device. The control bar 504, unlike the voice communication control 312 (shown in FIGS. 3-4), may provide additional information about available devices for voice communications via the voice communication component 218. The additional information may be provided by way of the text 506, the graphical representations (e.g., color, visual effects, etc.) of the bar 508, use of one or more of the icon(s) 510, and/or other interface features that provide information to a user such as an availability of devices for voice communications via the voice communication component 218. For example, the text 506 may include a number of devices available for voice communications or possibly other information.

As shown in the control bar 504 of the thirteenth UI 802, the information includes "Drop In", which does not indicate a specific device or contact. In this example, multiple target devices may be available to perform a voice communication via the voice communication component 218. In various embodiments, the control bar 504 of the thirteenth UI 802 may include a graphical representations (e.g., a color of blue or other graphical representations, etc.) of the bar 508 that indicates that at least some of the devices have recent activity as determined by the presence component 212. The recent activity may be indicated by depiction of the icon(s) 510, such as an icon indicating recent activity (e.g., an "A" icon, etc.).

The thirteenth UI 802 may include the conversation section 604 which may include conversations and/or information associated with one or more contacts. For example, the conversation may be a text-based message conversation with a contact or with multiple contacts. The conversation section 604 may include the first contact 606 associated with a first conversation, the second contact 608 associated with the second conversation, and/or the third contact 610 associated with a third conversation. At least some of the contacts may be available for a voice communication, and may have recent activity, which may be accessed by activation or selection of the control bar 504. Additional ways to initiate the voice communication may also be available.

The thirteenth UI 802 may include the information section 516, which may provide information to help a user initiate a voice communication that uses the voice communication component 218, for example. The information section 516 may include the sample voice commands 518 that may be helpful for the user to initiate a voice communication or perform other relevant tasks.

Activation or selection of the control bar 504 may cause the user interface to update as shown in a fourteenth UI 804. The fourteenth UI 804 may cause presentation of available target devices that may facilitate a voice communication via the voice communication component 218. The fourteenth UI 804 may include the common profile indicator 706 that indicates which common profile is represented in the fourteenth UI 804, such as "Dave S.". The fourteenth UI 804 may include the common profile section 708 that includes target devices having a shared profile with the user. The common profile section 708 may include the first device 710, "Kitchen Device", the second device 712, "Bedroom Device", the third device 714, "Living Room Device", and/or other devices having a common profile with the user and available for voice communications. Some devices may be temporarily unavailable for various reasons, such as devices that are on a call, set to "do not disturb", or performing a different operation. The icon 716 and/or other text or graphical representations may indicate devices that are not available, at least temporarily, for selection, such as via a grayed out format, etc. Devices may be unavailable due to being on another called, being designated by a user as "do not disturb", and/or for other reasons. Some devices may have recent activity, which may be indicated by a recent activity icon 806 and/or other graphical representations (e.g., colors, graphical effects, etc.).

The fourteenth UI 804 may include the contact device section 718 that includes target devices that do not have a shared profile with the user. The contact device section 718 may include the first contact 720, "Natalie S.", the second contact 722, "Claire C.", and/or other contacts that do not have a common profile with the user and are available for voice communications. The icon 716 and/or other text or graphical representations may indicate devices that are not available, at least temporarily, for selection, such as via a grayed out format, etc. The activity icon 806 or other graphical representations indicating recent activity for a contact may be provided in the UI. The contacts shown in the contact device section 718 may be associated with one or more devices. However, this device level information may be obscured from the user. Thus, information such as "do not disturb" may indicate that no device for "Natalie S." is currently available. Information such as "recent activity" may indicate that at least one of the devices associated with a particular contact have had recent activity. Selection of a device in these instances may be performed by the device selection component 214, as discussed above.

Figure 9:
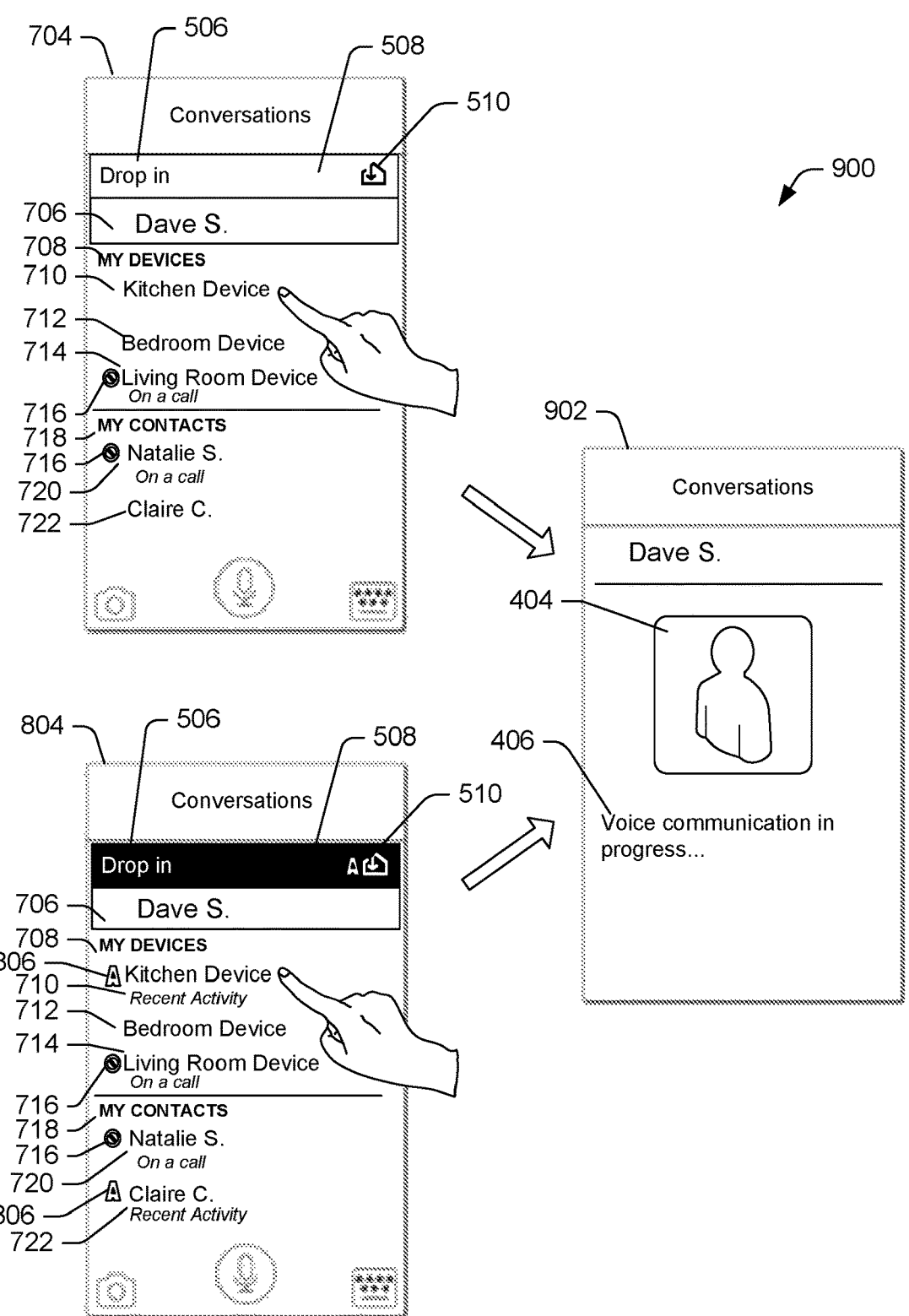
FIG. 9 is a schematic diagram of illustrative user interfaces depicting access from representations of devices that are available for voice communications to a voice communication.

FIG. 9 is a schematic diagram of illustrative user interfaces 900 depicting access from representations of devices that are available for voice communications to a voice communication. The user interfaces 900 include the twelfth UI 704, which does not show or include recent activity of devices, and the fourteenth UI 804 that indicates recent activity of at least some devices as described above. The twelfth UI 704 is described in detail above with reference to FIG. 7 while the fourteenth UI 804 is described in detail above with reference to FIG. 8. Activation or selection of a device or contact from the twelfth UI 704 or the fourteenth UI 804 may cause the user interface to update as shown in a fifteenth UI 902. Besides providing a new presentation of information, activation or selection of the device or contact may initiate the voice communication with a selected device. In some instances, such as when the selection is of a contact, the device selection component 214 may select a device for the voice connection, such as based on implementation of device selection rules as discussed above.

The fifteenth UI 902 may include the image 404, which may be an image or picture of the contact, an icon, and/or another type of graphical representation associated with the target device. The fifteenth UI 902 may include the information section 406 that may include information associated with the voice communication, such as connection status (e.g., connecting, connected, disconnected, etc.), a duration of the communication, members of the communication (possibly more than two if a conference call), and/or other relevant information.

Figure 10:
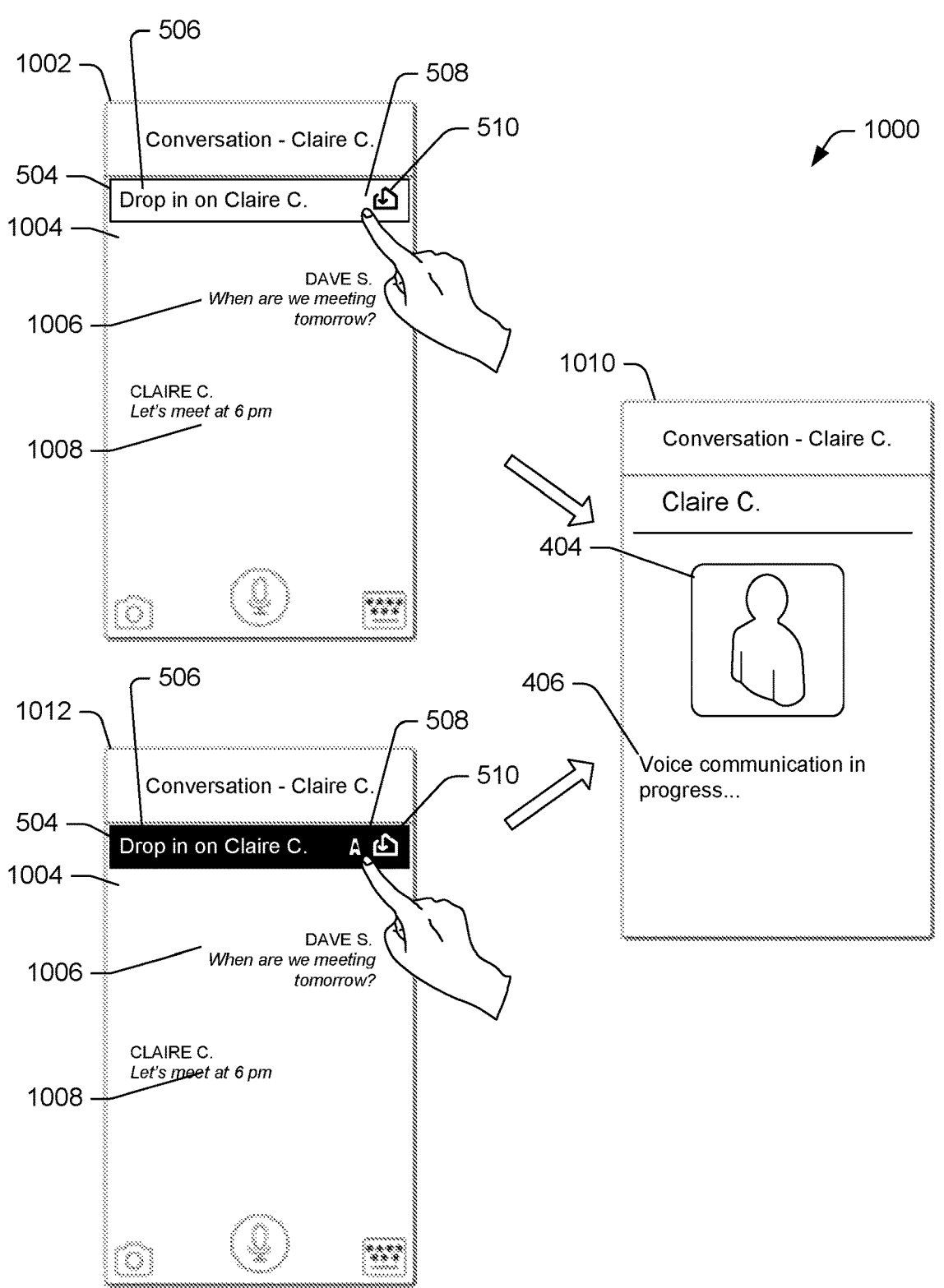
FIG. 10 is a schematic diagram of illustrative user interfaces depicting access from representations of devices that are available for voice communications to a voice communication, where at least some representations indicate recent activity associated with a corresponding device configured to receive a voice communication.

FIG. 10 is a schematic diagram of illustrative user interfaces 1000 depicting access from representations of devices that are available for voice communications to a voice communication, where at least some representations indicate recent activity associated with a corresponding device configured to receive a voice communication. The conversation interface may provide access to conversations, such as text-based conversations or other types of conversations involving contacts of a user.

A sixteenth user interface (UI) 1002 may include the control bar 504 that, when activated or selected, may cause initiation of a voice communication with a device. The control bar 504, unlike the voice communication control 312 (shown in FIGS. 3-4), may provide additional information about available devices for voice communications via the voice communication component 218. The additional information may be provided by way of the text 506, the graphical representations (e.g., color, visual effects, etc.) of the bar 508, use of one or more of the icon(s) 510, and/or other interface features that provide information to a user such as an availability of devices for voice communications via the voice communication component 218.

As shown in the control bar 504 of the sixteenth UI 1002, the information includes "Drop in on Claire C.", which is a specific device that does not share a common profile with the user that has a device configured to perform voice communications. In this example, Claire C. may have multiple target devices that are available to perform a voice communication via the voice communication component 218. However, since these devices are not controlled by the user, but instead by "Claire C.", the user does not have visibility to specific device that may be connected to for the voice communication. The device information is suppressed by the UI. In fact. "Claire C." may have multiple devices that are configured for voice communications via the voice communication component 218, but the sixteenth UI 1002 may only indicate a generic ability to connect to "Claire C." to avoid providing additional device information to the user regarding Claire C. and/or her devices or location. In some embodiments, the control bar 504 of the sixteenth UI 1002 may provide the name of a specific contact as the text 506 (e.g., "Claire C."). In various embodiments, the control bar 504 of the eighth UI 602 may include a graphical representations (e.g., a color of gray, etc.) of the bar 508 that indicates that none of the devices associated with Claire C. have recent activity as determined by the presence component 212.

The sixteenth UI 1002 may include a conversation section 1004 which may include conversation dialog with a specific contact (e.g., "Claire C."). For example, the conversation section 1004 may include a first message 1006 composed by "Dave S." and a second message 1008 composed by "Claire C.".

Activation or selection of the control bar 504 from the sixteenth UI 1002 may cause the user interface to update as shown in a seventeenth UI 1010. Besides providing a new presentation of information, activation or selection of the control bar may initiate the voice communication with a selected device. In some instances, such as when the selection is of a contact, the device selection component 214 may select a device for the voice connection, such as based on implementation of device selection rules as discussed above.

The seventeenth UI 1010 may include the image 404, which may be an image or picture of the contact, an icon, and/or another type of graphical representation associated with the target device. The seventeenth UI 1010 may include the information section 406 that may include information associated with the voice communication, such as connection status (e.g., connecting, connected, disconnected, etc.), a duration of the communication, members of the communication (possibly more than two if a conference call), and/or other relevant information.

An eighteenth UI 1012 may be similar to the sixteenth UI 1002 and may include the control bar 504, but may include different information represented in the control bar 504 by the text 506, the graphical representations of the bar 508, and/or the icon(s) 510. In this example, the control bar 504 of the eighteenth UI 1012 indicates recent activity of a device. The recent activity may be indicated by the graphical representations of the bar 508 (e.g., a color of blue or other color or graphical representations, etc.). The recent activity may be indicated by depiction of the icon(s) 510, such as an icon indicating recent activity (e.g., an "A" icon, etc.). The text 506 of the eighteenth UI 1012 may indicate a specific contact name that includes recent activity, such as "Claire C". In this example, the contact may only have one or more devices available for voice communications via the voice communication component 218. When multiple devices are available, the device selection component 214 may be used to select a target device for initiation of the voice communication via the voice communication component 218. The device may initiate the voice communication without an explicit user-selection of a target device since the selection may be performed by the device selection component 214 to hid or obscure at least some information about the contact from the user (e.g., information pertaining to specific devices and/or location information associated with a contact). As discussed above, the device selection component 214 may select the target device based on rules. The rules may prioritize selection of a device having most recent activity, for example.

The device may initiate the voice communication without an explicit user-selection of a target device. Following activation or selection of the control bar 504 of the eighteenth UI 1012 may cause the user interface to update as shown in a seventeenth UI 1010, which may operate and provide the information described above.

Figure 11:
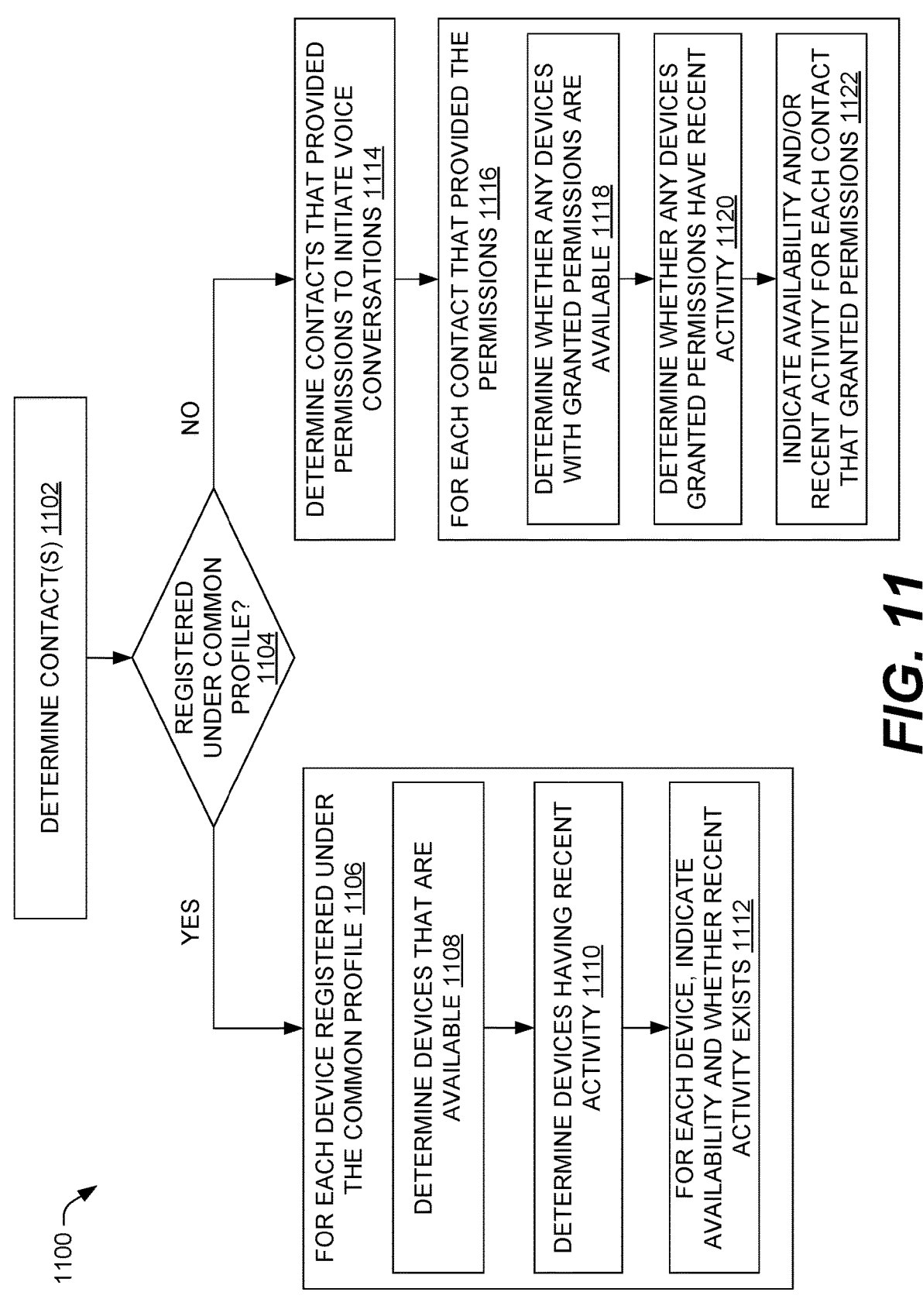
FIG. 11 is a flow diagram of an illustrative process to generate a user interface with representations of devices configured for voice communications.

FIGS. 11 and 12 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 11 is a flow diagram of an illustrative process 1100 to generate a user interface with representations of devices configured for voice communications. The process 1100 is described with reference to the environment 100 and the computing architecture 200. However, the process 1100 may be implemented in other environments and/or with other computing architecture.

At 1102, the application 206 may determine contacts available for voice communications via the voice communication component 218. The contacts may include a user's own profile, which may enable the user to connect to his or her other devices.

At 1104, the application 206 may determine if a contact is registered under a common profile as the user. When the contact is registered under the common profile (following the "yes" route from the decision operation 1104), then the process 1100 may advance to an operation 1106.

At 1106, the application 206 may perform operations 1108, 1110, and 1112 for each device registered under the common profile. At 1108, the application 206 determine devices that are available for receiving a voice communication. To be "available", the device may be recognizable on a network, have permission for contacted granted by an authorized user associated with the common profile, and be free from performing operations that prevent voice communications, such as by performing or hosting a different call or performing other operations.

At 1110, the application 206 may determine devices having recent activity. For example, the presence component 212 may monitor actions performed by devices to determine if a device performed an action associated with user interaction within a last threshold amount of time. The recent activity may be activity indicative of user presence, such as receipt of voice inputs from a user, video capture that includes the user, and/or other signals indicating presence of a user near the device.

At 1112, the application 206 may, for each device, indicate availability of the device and report any recent activity. For example, the application 206 may provide information to form a UI that reports each of the devices such as the UI 804.

When the contact is registered under the common profile (following the "yes" route from the decision operation 1104), then the process 1100 may advance to an operation 1114. At 1114, the application 206 may determine contacts that provided permissions, via the permission component
210, to initiate voice conversations with the user (or user
profile).

At 1116, the application 206 may perform operations
1118, 1120, and 1122 for each contact that provided the
permissions.

At 1118, the application 206 may whether any devices
with granted permissions are available for receiving a voice
communication. To be "available", the device may be rec-
ognizable on a network, have permission for contacted
granted by an authorized user associated with the common
profile, and be free from performing operations that prevent
voice communications, such as by performing or hosting a
different call or performing other operations.

At 1120, the application 206 may determine whether any
devices granted permissions are associated with user inter-
action within a last threshold amount of time. The recent
activity may be activity indicative of user presence, such as
receipt of voice inputs from a user, video capture that
includes the user, and/or other signals indicating presence of
a user near the device.

At 1122, the application 206 may, for each contact,
indicate availability if a single device is available for the
contact and report recent activity if a single device associ-
ated with the contact has recent activity. For example, the
application 206 may provide information to form a UI that
reports each of the contacts such as the UI 804.

In some embodiments, the application 206 may perform
operations of the process 1100 following both "yes" and
"no" routes to populate a user interface with both a user's
available device and contacts that are available for voice
communications.

FIG. 12 is a flow diagram of an illustrative process 1200
to share recent activity information associated with a device
configured for voice communication. The process 1200 is
described with reference to the environment 100 and the
computing architecture 200. However, the process 1200 may
be implemented in other environments and/or with other
computing architecture.

At 1202, the application 206 may receive permission to
indicate presence for a first device associated with a first user
to a second device associated with a second user. For
example an authorized user of the first device may grant a
permission for access by the second device or a profile
associated with the second user.

At 1204, the application 206 may associate the first device
with the second device. The first device may be a different
type of device than the second device. For example, the first
device may be a voice controlled device that lacks a display
and has few or no physical buttons whereas the second
device may be a mobile telephone.

At 1206, the application 206 may receive an indication of
activity from the first device. The activity may be deter-
mined based on signals generated by sensors of the first
device, such as a microphone, a camera, an accelerometer,
and/or signals from other sensors. The signals may indicate
a likely presence of a user. For example, spoken words
received by a microphone may likely indicate presence of a
human capable of engaging in a voice communication
whereas traffic noise may not.

At 1208, the application 206 may receive a request for
activity data from the second device. The request may be a
request to populate information on a UI of the second device
that indicate whether or not the first device includes activity
within a last threshold amount of time, such as a last five
minutes, a last 90 second, or a last other amount of time.

At 1210, the application 206 may provide the second
device with activity data indicating activity associated with
the first device. The activity data may be a binary value that
indicates presence or absence of recent activity. In some
embodiments, the activity data may include a time associ-
ated with a last known occurrence of activity for a contact
or device, which may be processed by the second device to
determine whether or not recent activity exists. In this
situation, the second device may compare the time stamp to
a current time and threshold duration to determine if the first
device includes recent activity.

CONCLUSION

Although the subject matter has been described in lan-
guage specific to structural features and/or methodological
acts, it is to be understood that the subject matter defined in
the appended claims is not necessarily limited to the specific
features or acts described. Rather, the specific features and
acts are disclosed as illustrative forms of implementing the
claims.

What is claimed is:

1. A method comprising:
generating a user interface including representations of at
least one of user profiles or devices, wherein the user
interface is configured to receive user input data to
customize which of the at least one of the user profiles
or the devices will receive audio data representing a
voice message;
causing the user interface to display an activity indicator
in association with the representations;
receiving, utilizing the user interface, the user input data
indicating a first device to receive the audio data;
receiving the audio data representing the voice message;
and
causing the audio data to be output on the first device
based at least in part on the user input data.

2. The method of claim 1, wherein the representations of
the at least one of the user profiles or the devices include a
location indicator assigned to the at least one of the user
profiles or the devices by a speech processing system
associated with the at least one of the user profiles or the
devices.

3. The method of claim 1, wherein the activity indicator
includes at least one of:
a first indication that audio is currently being output;
a second indication that output of the audio has been
paused; or
a third indication that audio output is unassociated with
the devices.

4. The method of claim 1, further comprising causing the
representations to include:
a first indication that the first device is available for
receiving the audio data representing the voice mes-
sage; and
a second indication that a second device of the devices is
not available for receiving the audio data representing
the voice message.

5. The method of claim 1, wherein the representations
associated with the devices include an icon indicating a
device type of individual ones of the devices, the device type
indicating that the devices are configured to receive the
audio data representing the voice message.

6. The method of claim 1, wherein the user input data
indicates a second device to receive the audio data, and the
method further comprises causing the audio data to be output on the first device and the second device concurrently based at least in part on the user input data.

7. The method of claim 6, further comprising:

determining that the second device is unable to receive the voice message;

based at least in part on the second device being unable to receive the voice message, causing the user interface to display an option to enable receipt of the voice message at the second device; and based at least in part on receiving selection of the option, enabling receipt of the voice message at the second device.

8. The method of claim 1, wherein:

individual ones of the representations of the devices represent a communal device associated with account data; and the user input data is received from a second device associated with the account data.

9. The method of claim 1, wherein:

the first device is a communal device; and the user input data is received from a mobile device associated with the communal device.

10. The method of claim 1, wherein selection of a representation of a user profile of the user profiles enables the user profile to send voice messages to the devices when a second device associated with the user profile is located in a different location from the devices.

11. A system comprising:

one or more processors; and non-transitory computer-readable media storing instructions that, when executed by the one or more processors, cause the one or more processors to perform operations comprising:

generating a user interface including representations of at least one of user profiles or devices, wherein the user interface is configured to receive user input data to customize which of the at least one of the user profiles or the devices will receive audio data representing a voice message;

causing the user interface to display an activity indicator in association with the representations;

receiving, utilizing the user interface, the user input data indicating a first device to receive the audio data;

receiving the audio data representing the voice message; and causing the audio data to be output on the first device based at least in part on the user input data.

12. The system of claim 11, wherein the representations of the at least one of the user profiles or the devices include a location indicator assigned to the at least one of the user profiles or the devices by a speech processing system associated with the at least one of the user profiles or the devices.

13. The system of claim 11, wherein the activity indicator includes at least one of:

a first indication that audio is currently being output;

a second indication that output of the audio has been paused; or a third indication that audio output is unassociated with the devices.

14. The system of claim 11, the operations further comprising causing the representations to include:

a first indication that the first device is available for receiving the audio data representing the voice message; and a second indication that a second device of the devices is not available for receiving the audio data representing the voice message.

15. The system of claim 11, wherein the representations associated with the devices include an icon indicating a device type of individual ones of the devices, the device type indicating that the devices are configured to receive the audio data representing the voice message.

16. The system of claim 11, wherein the user input data indicates a second device to receive the audio data, and the operations further comprise causing the audio data to be output on the first device and the second device concurrently based at least in part on the user input data.

17. The system of claim 16, the operations further comprising:

determining that the second device is unable to receive the voice message;

based at least in part on the second device being unable to receive the voice message, causing the user interface to display an option to enable receipt of the voice message at the second device; and based at least in part on receiving selection of the option, enabling receipt of the voice message at the second device.

18. The system of claim 11, wherein:

each of the representations of the devices represent a communal device associated with account data; and the user input data is received from a second device associated with the account data.

19. The system of claim 11, wherein:

the first device is a communal device; and the user input data is received from a mobile device associated with the communal device.

20. The system of claim 11, wherein selection of a representation of a user profile of the user profiles enables the user profile to send voice messages to the devices when a second device associated with the user profile is located in a different location from the devices.

* * * * *